United States Patent
Lindemann

(10) Patent No.: US 9,396,320 B2
(45) Date of Patent: Jul. 19, 2016

(54) SYSTEM AND METHOD FOR NON-INTRUSIVE, PRIVACY-PRESERVING AUTHENTICATION

(71) Applicant: NOK NOK LABS, INC., Palo Alto, CA (US)

(72) Inventor: Rolf Lindemann, Steele (DE)

(73) Assignee: NOK NOK LABS, INC., Palo Alto, CA (US)

( * ) Notice: Subject to any disclaimer, the term of this patent is extended or adjusted under 35 U.S.C. 154(b) by 0 days.

(21) Appl. No.: 14/145,439

(22) Filed: Dec. 31, 2013

(65) Prior Publication Data

US 2014/0289819 A1    Sep. 25, 2014

Related U.S. Application Data

(60) Provisional application No. 61/804,568, filed on Mar. 22, 2013.

(51) Int. Cl.
*H04L 29/06* (2006.01)
*G06F 21/32* (2013.01)
(Continued)

(52) U.S. Cl.
CPC .............. *G06F 21/32* (2013.01); *G06F 21/577* (2013.01); *G06Q 20/204* (2013.01);
(Continued)

(58) Field of Classification Search
CPC ....... G06F 21/30; G06F 21/31; G06F 21/316; G06F 21/32; G06F 21/577; G06F 2221/2115; H04L 63/0861; H04L 63/0492; H04L 63/08; H04L 63/083; H04L 63/20; H04L 9/0819; H04L 9/0822; H04L 9/0841; H04L 9/3231; H04L 9/3247; H04L 9/3297; H04L 2209/805; H04L 2463/102; H04W 12/06; G06Q 20/40145; G06Q 20/204; G06Q 20/3224; G06Q 20/3274; G06Q 20/3278; G06Q 20/4012; G06Q 20/42; G06Q 20/425; G07F 19/20

USPC .......................................................... 713/186
See application file for complete search history.

(56) References Cited

U.S. PATENT DOCUMENTS 6,618,806 B1    9/2003    Brown et al.
6,751,733 B1    6/2004    Nakamura et al.
(Continued)

FOREIGN PATENT DOCUMENTS

WO    WO2013/082190    6/2013

OTHER PUBLICATIONS

Anthony J. Nicholson, "Mobile Device Security Using Transient Authentication," IEEE Transactions on Mobile Computing vol. 5, No. 11, pp. 1489-1502 (Nov. 2006).
(Continued)

*Primary Examiner* — Yogesh Paliwal
(74) *Attorney, Agent, or Firm* — Nicholson De Vos Webster & Elliott, LLP

(57) ABSTRACT

A system, apparatus, method, and machine readable medium are described for non-intrusive privacy-preserving authentication. For example, one embodiment of a method comprises: entering into a legitimate user state on a client device for a time period following an explicit authentication by an end user; recording reference data related to user behavior while in the legitimate user state; measuring user behavior when outside of the legitimate user state and arriving at an authentication assurance level based on a distance between the measured user behavior and the recorded reference data; in response to an authentication request within the legitimate user state, providing an authentication assurance level at or above a defined threshold, the authentication assurance level being sufficient to authenticate the user to a relying party; and in response to an authentication request while outside of the legitimate user state, providing the authentication assurance level based on a distance between the measured user behavior and the recorded reference data.

25 Claims, 12 Drawing Sheets

(51) Int. Cl.
*G06Q 20/40* (2012.01)
*G06Q 20/42* (2012.01)
*H04L 9/32* (2006.01)
*H04L 9/08* (2006.01)
*G06F 21/57* (2013.01)
*G07F 19/00* (2006.01)
*G06Q 20/20* (2012.01)
*G06Q 20/32* (2012.01)
*H04W 12/06* (2009.01)

(52) U.S. Cl.
CPC ....... *G06Q 20/3224* (2013.01); *G06Q 20/3274* (2013.01); *G06Q 20/3278* (2013.01); *G06Q 20/4012* (2013.01); *G06Q 20/40145* (2013.01); *G06Q 20/42* (2013.01); *G06Q 20/425* (2013.01); *G07F 19/20* (2013.01); *H04L 9/0819* (2013.01); *H04L 9/0822* (2013.01); *H04L 9/0841* (2013.01); *H04L 9/3231* (2013.01); *H04L 9/3247* (2013.01); *H04L 9/3297* (2013.01); *H04L 63/0492* (2013.01); *H04L 63/08* (2013.01); *H04L 63/083* (2013.01); *H04L 63/0861* (2013.01); *H04L 63/20* (2013.01); *G06F 2221/2115* (2013.01); *H04L 2209/805* (2013.01); *H04L 2463/102* (2013.01); *H04W 12/06* (2013.01)

(56) References Cited

U.S. PATENT DOCUMENTS

| | | | |
|---|---|---|---|
| 6,938,156 | B2 | 8/2005 | Wheeler et al. |
| 7,487,357 | B2 | 2/2009 | Smith et al. |
| 7,698,565 | B1 | 4/2010 | Bjorn et al. |
| 8,060,922 | B2 | 11/2011 | Crichton |
| 8,166,531 | B2 | 4/2012 | Suzuki |
| 8,245,030 | B2 | 8/2012 | Lin |
| 8,353,016 | B1 | 1/2013 | Pravetz et al. |
| 8,584,224 | B1 | 11/2013 | Pei et al. |
| 8,713,325 | B2 | 4/2014 | Ganesan |
| 8,719,905 | B2 | 5/2014 | Ganesan |
| 8,776,180 | B2 | 7/2014 | Kumar et al. |
| 8,856,541 | B1 | 10/2014 | Chaudhury et al. |
| 8,949,978 | B1 | 2/2015 | Lin |
| 8,958,599 | B1 | 2/2015 | Starner |
| 8,978,117 | B2 | 3/2015 | Bentley et al. |
| 9,032,485 | B2 | 5/2015 | Chu |
| 2002/0073316 | A1 | 6/2002 | Collins et al. |
| 2003/0065805 | A1 | 4/2003 | Barnes |
| 2003/0087629 | A1 | 5/2003 | Juitt |
| 2003/0135740 | A1 | 7/2003 | Talmor et al. |
| 2003/0152252 | A1 | 8/2003 | Kondo |
| 2003/0226036 | A1 | 12/2003 | Bivens et al. |
| 2004/0101170 | A1 | 5/2004 | Tisse |
| 2004/0123153 | A1 | 6/2004 | Wright et al. |
| 2005/0160052 | A1 | 7/2005 | Schneider |
| 2005/0223236 | A1 | 10/2005 | Yamada et al. |
| 2005/0278253 | A1 | 12/2005 | Meek et al. |
| 2006/0029062 | A1 | 2/2006 | Rao |
| 2006/0282670 | A1 | 12/2006 | Karchov |
| 2007/0005988 | A1 | 1/2007 | Zhang et al. |
| 2007/0088950 | A1 | 4/2007 | Wheeler et al. |
| 2007/0107048 | A1 | 5/2007 | Halls et al. |
| 2007/0165625 | A1 | 7/2007 | Elsner |
| 2007/0168677 | A1 | 7/2007 | Kudo |
| 2007/0169182 | A1 | 7/2007 | Wolfond |
| 2007/0278291 | A1 | 12/2007 | Rans et al. |
| 2008/0005562 | A1 | 1/2008 | Sather et al. |
| 2008/0046334 | A1 | 2/2008 | Lee et al. |
| 2008/0046984 | A1 | 2/2008 | Bohmer et al. |
| 2008/0049983 | A1 | 2/2008 | Miller et al. |
| 2008/0086759 | A1 | 4/2008 | Colson |
| 2008/0134311 | A1 | 6/2008 | Medvinsky |
| 2008/0172725 | A1 | 7/2008 | Fujii et al. |
| 2008/0235801 | A1 | 9/2008 | Soderberg et al. |
| 2008/0271150 | A1 | 10/2008 | Boerger et al. |
| 2008/0289019 | A1 | 11/2008 | Lam |
| 2008/0313719 | A1 | 12/2008 | Kaliski, Jr., et al. |
| 2008/0320308 | A1 | 12/2008 | Kostiainen et al. |
| 2009/0064292 | A1 | 3/2009 | Carter et al. |
| 2009/0089870 | A1 | 4/2009 | Wahl |
| 2009/0116651 | A1 | 5/2009 | Liang |
| 2009/0133113 | A1 | 5/2009 | Schneider |
| 2009/0138724 | A1 | 5/2009 | Chiou et al. |
| 2009/0138727 | A1 | 5/2009 | Campello |
| 2009/0158425 | A1 | 6/2009 | Chan et al. |
| 2009/0183003 | A1 | 7/2009 | Haverinen |
| 2009/0193508 | A1 | 7/2009 | Brenneman |
| 2009/0204964 | A1 | 8/2009 | Foley |
| 2009/0235339 | A1 | 9/2009 | Mennes et al. |
| 2009/0328197 | A1 | 12/2009 | Newell |
| 2010/0029300 | A1 | 2/2010 | Chen |
| 2010/0042848 | A1 | 2/2010 | Rosener |
| 2010/0070424 | A1 | 3/2010 | Monk |
| 2010/0082484 | A1 | 4/2010 | Erhart et al. |
| 2010/0105427 | A1 | 4/2010 | Gupta |
| 2010/0169650 | A1 | 7/2010 | Brickell et al. |
| 2010/0175116 | A1 | 7/2010 | Gum |
| 2010/0186072 | A1 | 7/2010 | Kumar |
| 2010/0223663 | A1 | 9/2010 | Morimoto et al. |
| 2010/0242088 | A1 | 9/2010 | Thomas |
| 2010/0325664 | A1 | 12/2010 | Kang |
| 2010/0325684 | A1 | 12/2010 | Grebenik |
| 2010/0325711 | A1 | 12/2010 | Etchegoyen |
| 2011/0004933 | A1 | 1/2011 | Dickinson et al. |
| 2011/0022835 | A1 | 1/2011 | Schibuk |
| 2011/0047608 | A1 | 2/2011 | Levenberg |
| 2011/0078443 | A1 | 3/2011 | Greentstein et al. |
| 2011/0082801 | A1 | 4/2011 | Baghdasaryan et al. |
| 2011/0083016 | A1 | 4/2011 | Kesanupalli et al. |
| 2011/0107087 | A1 | 5/2011 | Lee et al. |
| 2011/0167154 | A1 | 7/2011 | Bush et al. |
| 2011/0191200 | A1 | 8/2011 | Bayer et al. |
| 2011/0197267 | A1 | 8/2011 | Gravel et al. |
| 2011/0219427 | A1 | 9/2011 | Hito et al. |
| 2011/0246766 | A1 | 10/2011 | Orsini et al. |
| 2011/0265159 | A1 | 10/2011 | Ronda |
| 2011/0279228 | A1 | 11/2011 | Kumar |
| 2011/0280402 | A1 | 11/2011 | Ibrahim et al. |
| 2011/0296518 | A1 | 12/2011 | Faynberg et al. |
| 2011/0307949 | A1 | 12/2011 | Ronda |
| 2011/0314549 | A1 | 12/2011 | Song et al. |
| 2012/0018506 | A1 | 1/2012 | Hammad et al. |
| 2012/0023568 | A1 | 1/2012 | Cha et al. |
| 2012/0046012 | A1 | 2/2012 | Forutanpour et al. |
| 2012/0084566 | A1 | 4/2012 | Chin et al. |
| 2012/0102553 | A1 | 4/2012 | Hsueh et al. |
| 2012/0124651 | A1 | 5/2012 | Ganesan |
| 2012/0159577 | A1 | 6/2012 | Belinkiy |
| 2012/0191979 | A1 | 7/2012 | Feldbau |
| 2012/0204032 | A1 | 8/2012 | Wilkings |
| 2012/0272056 | A1 | 10/2012 | Ganesan |
| 2012/0313746 | A1 | 12/2012 | Rahman et al. |
| 2012/0317297 | A1 | 12/2012 | Bailey |
| 2013/0042327 | A1 | 2/2013 | Chow |
| 2013/0046976 | A1 | 2/2013 | Rosati |
| 2013/0061055 | A1 | 3/2013 | Schibuk |
| 2013/0073859 | A1 | 3/2013 | Carlson et al. |
| 2013/0097682 | A1 | 4/2013 | Zeljkovic |
| 2013/0119130 | A1 | 5/2013 | Braams |
| 2013/0124285 | A1 | 5/2013 | Pravetz et al. |
| 2013/0125197 | A1 | 5/2013 | Pravetz et al. |
| 2013/0125222 | A1 | 5/2013 | Pravetz et al. |
| 2013/0133049 | A1 | 5/2013 | Peirce |
| 2013/0144785 | A1 | 6/2013 | Karpenko et al. |
| 2013/0159413 | A1 | 6/2013 | Davis et al. |
| 2013/0159716 | A1 | 6/2013 | Buck et al. |
| 2013/0337777 | A1 | 12/2013 | Deutsch et al. |
| 2014/0007215 | A1 | 1/2014 | Romano |
| 2014/0013422 | A1* | 1/2014 | Janus et al. ............... 726/19 |
| 2014/0040987 | A1 | 2/2014 | Haugsnes |
| 2014/0044265 | A1 | 2/2014 | Kocher et al. |
| 2014/0066015 | A1 | 3/2014 | Aissi |

(56) References Cited

U.S. PATENT DOCUMENTS

| | | | |
|---|---|---|---|
| 2014/0068746 | A1 | 3/2014 | Gonzalez |
| 2014/0075516 | A1 | 3/2014 | Chermside |
| 2014/0089243 | A1 | 3/2014 | Oppenheimer |
| 2014/0096182 | A1 | 4/2014 | Smith |
| 2014/0101439 | A1 | 4/2014 | Pettigrew et al. |
| 2014/0109174 | A1 | 4/2014 | Barton |
| 2014/0115702 | A1 | 4/2014 | Li et al. |
| 2014/0130127 | A1 | 5/2014 | Toole et al. |
| 2014/0137191 | A1* | 5/2014 | Goldsmith et al. ............... 726/3 |
| 2014/0164776 | A1 | 6/2014 | Hook et al. |
| 2014/0173754 | A1 | 6/2014 | Barbir |
| 2014/0188770 | A1* | 7/2014 | Agrafioti et al. ............... 706/13 |
| 2014/0189350 | A1 | 7/2014 | Baghdasaryan |
| 2014/0189360 | A1 | 7/2014 | Baghdasaryan |
| 2014/0189779 | A1 | 7/2014 | Baghdasaryan |
| 2014/0189791 | A1 | 7/2014 | Lindemann |
| 2014/0189807 | A1 | 7/2014 | Cahill et al. |
| 2014/0189828 | A1 | 7/2014 | Baghdasaryan |
| 2014/0201809 | A1 | 7/2014 | Choyi et al. |
| 2014/0250523 | A1* | 9/2014 | Savvides et al. ............... 726/19 |
| 2014/0258125 | A1 | 9/2014 | Gerber et al. |
| 2014/0258711 | A1 | 9/2014 | Brannon |
| 2014/0282868 | A1 | 9/2014 | Sheller et al. |
| 2014/0282945 | A1 | 9/2014 | Smith et al. |
| 2014/0282965 | A1* | 9/2014 | Sambamurthy et al. .......... 726/7 |
| 2014/0289833 | A1 | 9/2014 | Briceno et al. |
| 2014/0298419 | A1 | 10/2014 | Boubez |
| 2015/0180869 | A1 | 6/2015 | Verma |
| 2015/0269050 | A1 | 9/2015 | Filimonov |
| 2015/0326529 | A1 | 11/2015 | Morita |
| 2015/0381580 | A1 | 12/2015 | Graham et al. |

OTHER PUBLICATIONS

Mohammad O. Derawi, "Unobtrusive User-Authentication on Mobile Phones using Biometric Gait Recognition" (2010).

Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf).

BehavioSec, "Measuring FAR/FRR/EER in Continuous Authentication," Stockholm, Sweden (2009).

the Online Certificate Status Protocol (OCSP, RFC2560).

see current WikiPedia article for "Eye Tracking" at en.wikipedia.org/wiki/Eye_tracking.

(see Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).

Notification of Transmittal of the International Search Report and the Written Opinion from counterpart Patent Cooperation Treaty Application No. PCT/US14/31344, mailed Nov. 3, 2014, 8 pages.

Office Action from U.S. Appl. No. 14/066,384, mailed Jan. 7, 2015, 24 pages.

Office Action from U.S. Appl. No. 14/145,439, mailed Feb. 12, 2015, 18 pages.

Office Action from U.S. Appl. No. 14/145,533, mailed Jan. 26, 2015, 13 pages.

Office Action from U.S. Appl. No. 14/145,607, mailed Mar. 20, 2015, 22 pages.

Office Action from U.S. Appl. No. 14/218,551, mailed Apr. 23, 2015, 9 pages.

Office Action from U.S. Appl. No. 14/218,575, mailed Feb. 10, 2015, 17 pages.

Notice of Allowance from U.S. Appl. No. 14/145,533, mailed May 11, 2015, 5 pages.

Office Action from U.S. Appl. No. 14/218,575, mailed Aug. 7, 2015, 19 pages.

Office Action from U.S. Appl. No. 14/066,384, mailed Aug. 20, 2015, 23 pages.

Notice of Allowance from U.S. Appl. No. 14/145,607, mailed Sep. 2, 2015, 19 pages.

Final Office Action from U.S. Appl. No. 14/218,551, mailed Sep. 9, 2015, 15 pages.

Notice of Allowance from U.S. Appl. No. 14/145,533, mailed Aug. 14, 2015, 13 pages.

Schneier, B., "Biometrics: Uses and Abuses". Aug. 1999. Inside Risks 110 (CACM 42, 8, Aug. 1999). http://www.schneier.com/essay-019.pdf.

Zhao, W., et al. "Face Recognition: A Literature Survey". ACM Computing Surveys, vol. 35, No. 4. Dec. 2003, pp. 399-458.

Abate, A., et al., "2D and 3D face recognition: A survey". Pattern Recognition Letters. 2007, 28, pp. 1885-1906.

GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.

Wilson, R., James. Unbuntu Life, "How to Trick Google's New Face Unlock On Android 4.1 Jelly Bean". Print Screen Mac. [Online] Aug. 6, 2012. [Cited: Sep. 28, 2012.] http://printscreenmac.info/how-to-trick-android-jelly-bean-face-unlock/. downloaded Aug. 13, 2015.

Phillips, P., J., et al., "Face Recognition Vendor Test 2002: Evaluation Report". s.l.: NISTIR 6965, 2002. 56 pages. http://www.face-rec.org/vendors/FRVT_2002_Evaluation_Report.pdf.

Phillips, P.J., et al., "FRVT 2006 and ICE 2006 Large-Scale Results", NIST IR 7408. Gaithersburg: NIST, 2006. Mar. 29, 2007. pp. 1-55.

Grother, P.J., et al., NIST. Report on the Evaluation of 2D Still-Image Face Recognition Algorithms, NIST IR 7709. s.l.: NIST, 2011. Jun. 22, 2010. pp. 1-58.

Chakka, M., et al., "Competition on Counter Measures to 2-D Facial Spoofing Attacks". 6 pages. 2011. http://www.csis.pace.edu/~ctappert/dps/IJCB2011/papers/130.pdf. 978-1-4577-1359-0/11.

Ratha, N., et al., IBM Thomas J. Watson Research Center. An Analysis of Minutiae Matching StrengthP. Hawthorne, NY 10532: IBM. 7 pages. http://pdf.aminer.org/000/060/741/an_analysis_of_minutiae_matching_strength.pdf.

Roberts, C., "Biometric Attack Vectors and Defences". Sep. 2006. 25 pages. http://otago.ourarchive.ac.nz/bitstream/handle/10523/1243/BiometricAttackVectors.pdf.

Pinto, A., et al., "Video-Based Face Spoofing Detection through Visual Rhythm Analysis". Los Alamitos: IEEE Computer Society Conference Publishing Services, 2012. Conference on Graphics, Patterns and Images, 25. 8 pages. (SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.

Li, J., et al., "Live Face Detection Based on the Analysis of Fourier Spectra". Biometric Technology for Human Identification. 2004, pp. 296-303.

Tan, X., et al., "Face Liveness Detection from A Single Image with Sparse Low Rank Bilinear Discriminative Model". s.l.: European Conference on Computer Vision, 2010. pp. 1-14.

Määttä, J., et al., "Machine Vision Group, University of Oulu", Finland. "Face Spoofing Detection From Single Images Using Micro-Texture Analysis". Oulu, Finland: IEEE, 2011. pp. 1-7. http://www.ee.oulu.fi/research/mvmp/mvg/files/pdf/131.pdf.

R. Tronci, D. Muntoni, G. Fadda, M. Pili, N. Sirena, G. Murgia, M. Ristori, and F. Roli. Fusion of Multiple Clues for Photo-Attack Detection in Face Recognition Systems. s.l.: Intl. Joint Conference on Biometrics, 2011. pp. 1-6.

Heikkilä, M., et al., "A Texture-Based Method for Modeling the Background and Detecting Moving Objects". Oulu: IEEE, Jun. 22, 2005. DRAFT. 16 pages. http://www.ee.oulu.fi/mvg/files/pdf/pdf_662.pdf.

Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.

Kong, S., et al., "Recent advances in visual and infrared face recognition"—a review. Journal of Computer Vision and Image Understanding. Jun. 2005, vol. 1, 97, pp. 103-135.

Kollreider, K., et al., Halmstad University, SE-30118, Sweden. Evaluating Liveness by Face Images and the Structure Tensor. Halmstad, Sweden: s.n., 2005. http://citeseerx.ist.psu.edu/viewdoc/download?doi=10.1.1.62.6534&rep=rep1&type=pdf.

(56) References Cited

OTHER PUBLICATIONS

Smiatacz, M., et al., Gdansk University of Technology. Liveness Measurements Using Optical Flow For Biometric Person Authentication. Metrology and Measurement Systems. 2012, vol. XIX, 2. pp. 257-268.
Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.
Pan, G., et al., "Liveness Detection for Face Recognition". Recent Advances in Face Recognition. Vienna: I-Tech, 2008, Ch. 9, pp. 109-124, ISBN: 978-953-7619-34-3.
National Science & Technology Council's Subcommittee on Biometrics. Biometrics Glossary. 33 pages, Last updated Sep. 14, 2006. NSTC. http://www.biometrics.gov/documents/glossary.pdf.
Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview_EUSIPCO04.pdf.
Rodrigues, R.N., et al. Robustness of multimodal biometric fusion methods against spoof attacks. Journal of Visual Language and Computing. 2009. 11 pages, doi:10.1016/j.jvlc.2009.01.010; http://cubs.buffalo.edu/govind/papers/visual09.pdf.
Akhtar, Z., et al., "Spoof Attacks on Multimodal Biometric Systems". Alfarid. Singapore: IACSIT Press, Singapore, 2011. 2011 International Conference on Information and Network Technology IPCSIT. vol. 4. pp. 46-51. http://www.ipcsit.com/vol4/9-ICINT2011T046.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Lubin, G., et al., Business Insider. "16 Heatmaps That Reveal Exactly Where People Look". [Online] May 21, 2012. [Cited: Nov. 1, 2012.] pp. 1-21. http://www.businessinsider.com/eye-tracking-heatmaps-2012-5?op=1.
Huang, L., et al., "Clickjacking: Attacks and Defenses". s.l.: Usenix Security 2012, pp. 1-16, 2012. https://www.usenix.org/system/files/conference/usenixsecurity12/sec12-final39.pdf.
Willis, N., Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.
Chetty, G. School of ISE, University of Canberra, Australia. "Multi-level liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.
Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PervComp2012_draft.pdf.
Jafri, R., et al., "A Survey of Face Recognition Techniques. Journal of Information Processing Systems", vol. 5, No. 2, Jun. 2009. Jun. 2009, vol. 5, 2, pp. 41-68. http://www.cosy.sbg.ac.at/~uhl/face_recognition.pdf.
Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.
Phillips, P. J., et al., "Biometric Image Processing And Recognition". Chellappa. 1998. Eusipco .8 pages.
Zhou, et al., "Face Recognition from Still Images and Videos". University of Maryland, College Park, MD 20742. Maryland: s.n., Nov. 5, 2004. pp. 1-23, http://citeseerx.ist.psu.edu/viewdoc/download?doi=10.1.1.77.1312&rep=rep1&type=pdf.
Quinn, G.W., et al., NIST. "Performance of Face Recognition Algorithms on Compressed Images", NIST Inter Agency Report 7830. s.l.: NIST, Dec. 4, 2011.
The Extended M2VTS Database. [Online] [Cited: Sep. 29, 2012.] downloaded Jan. 28, 2015, 1 page; http://www.ee.surrey.ac.uk/CVSSP/xm2vtsdb/.
Ratha, N. K., et al., IBM. "Enhancing security and privacy in biometrics-based authentication systems". IBM Systems Journal. 2001, vol. 40, 3. pp. 614-634.
Schuckers, S., Schuckers SAC. "Spoofing and Anti-Spoofing Measures". Information Security Technical Report. Dec. 10, 2002, vol. 7, 4., pp. 56-62.
Schwartz, W., et al., "Face Spoofing Detection through Partial Least Squares and Low-Level Descriptors". s.l.: Intl. Joint Conference on Biometrics,, 2011. pp. 1-8.
Edited by Kresimir Delac, Mislay Grgic and Marian Stewart Bartlett. s.l.: InTech, Jun. 1, 2008. http://cdn.intechopen.com/finals/81/InTech-Recent_advances_in_face_recognition.zip. ISBN 978-953-7619-34-3. Uploaded as Chapters 1-15.
Pan, G., et al., "Monocular camera-based face liveness detection by combining eyeblink and scene context" pp. 215-225. s.l.: Springer Science+Business Media, LLC, Aug. 4, 2010. http://www.cs.zju.edu.cn/~gpan/publication/2011-TeleSys-liveness.pdf.
Tronci, R, et al., "Fusion of multiple clues for photo-attack detection in face recognition systems". 09010 Pula (CA), Italy: s.n., 2011. pp. 1-6. http://prag.diee.unica.it/pra/system/files/Amilab_IJCB2011.pdf.
Rocha, A., et al., "Vision of the Unseen: Current Trends and Challenges in Digital Image and Video Forensics". s.l.: ACM Computing Surveys, 2010. http://www.wjscheirer.com/papers/wjs_csur2011_forensics.pdf.
Brickell, E., et al., Intel Corporation; Jan Camenish, IBM Research; Liqun Chen, HP Laboratories. "Direct Anonymous Attestation". Feb. 11, 2004, pp. 1-28. http://eprint.iacr.org/2004/205.pdf.
Linux.com, The source for Linux information. 2012. 3 pages, downloaded Jan. 28, 2015.
Kollreider, K., et al., "Non-intrusive liveness detection by face images". Image Vis. Comput. (2007). doi:10.1016/j.imavis.2007.05.004, Received Feb. 18, 2006, received in revised form, Jan. 24, 2007 and accepted May 22, 2007. 12 pages.
Notification of Transmittal of the International Search Report and the Written Opinion from counterpart Patent Cooperation Treaty Application No. PCT/US13/77888, mailed Aug. 8, 2014, 10 pages.
Transmittal of the International Search Report and the Written Opinion from counterpart Patent Cooperation Treaty Application No. PCT/US13/77888, mailed Jul. 9, 2015, 7 pages.
Notification of Transmittal of the International Search Report and the Written Opinion from counterpart Patent Cooperation Treaty Application No. PCT/US14/39627, mailed Oct. 16, 2014, 3 pages.
Transmittal of the International Search Report and the Written Opinion from counterpart Patent Cooperation Treaty Application No. PCT/US14/39627, mailed Dec. 10, 2015, 8 pages.
Office Action from U.S. Appl. No. 14/066,273, mailed May 8, 2015, 31 pages.
Notice of Allowance from U.S. Appl. No. 14/145,439, mailed Jul. 6, 2015, 6 pages.
Office Action from U.S. Appl. No. 14/268,733, mailed Jul. 16, 2015, 13 pages.
Notification of Transmittal of the International Search Report and the Written Opinion from counterpart Patent Cooperation Treaty Application No. PCT/US2015/028924, mailed Jul. 30, 2015, 10 pages.
Office Action from U.S. Appl. No. 14/268,619, mailed Aug. 24, 2015, 17 pages.
Notice of Allowance from U.S. Appl. No. 14/448,697, mailed Sep. 15, 2015, 14 pages.
Notification of Transmittal of the International Search Report and the Written Opinion from counterpart Patent Cooperation Treaty Application No. PCT/US2015/042785, mailed Oct. 16, 2015, 8 pages.

(56) References Cited

OTHER PUBLICATIONS

Notification of Transmittal of the International Search Report and the Written Opinion from counterpart Patent Cooperation Treaty Application No. PCT/US2015/042799, mailed Oct. 19, 2015, 13 pages.
Notice of Allowance from U.S. Appl. No. 14/268,686, mailed Nov. 5, 2015, 23 pages.
Office Action from U.S. Appl. No. 14/448,641, mailed Nov. 9, 2015, 21 pages.
Barker et al; "Recommendation for key management Part 3: Application—Specific Key Management Guidance"; NIST special Publication 800-57, pp. 1-103, Dec. 2009.
Office Action from U.S. Appl. No. 14/448,814, mailed Aug. 4, 2015, 13 pages.
World Wide Web Consortium, W3C Working Draft: Media Capture and Streams (2013).
Office Action from U.S. Appl. No. 14/218,692, mailed Nov. 4, 2015, 16 pages.
Notice of Allowance from U.S. Appl. No. 14/145,439, mailed Oct. 28, 2015, 12 pages.
Brickell, Ernie, Jan Camenisch, and Liqun Chen. "Direct anonymous attestation." *Proceedings of the 11th ACM conference on Computer and communications security.* ACM, 2004, 6 pages.
Chen, Liqun, and Jiangtao Li. "Flexible and scalable digital signatures in TPM 2.0." *Proceedings of the 2013 ACM SIGSAC conference on Computer & communications security.* ACM, 2013.
Chakka, Murali Mohan, et al. "Competition on counter measures to 2-d facial spoofing attacks." Biometrics (IJCB), 2011 *International Joint Conference on.* IEEE, 2011, 6 pages.
Marcialis, Gian Luca, et al. "First international fingerprint liveness detection competition—livdet 2009." *Image Analysis and Processing—ICIAP 2009.* Springer Berlin Heidelberg, 2009. 12-23.
Uludag, Umut, and Anil K. Jain. "Attacks on biometric systems: a case study in fingerprints." *Electronic Imaging 2004.* International Society for Optics and Photonics, 2004, 12 pages.
Ratha, Nalini K., Jonathan H. Connell, and Ruud M. Bolle. "An analysis of minutiae matching strength." *Audio-and Video-Based Biometric Person Authentication.* Springer Berlin Heidelberg, 2001, 7 pages.

Notification of Transmittal of the International Search Report and the Written Opinion from counterpart Patent Cooperation Treaty Application No. PCT/US2015/042870, mailed Oct. 30, 2015, 9 pages.
Notification of Transmittal of the International Search Report and the Written Opinion from counterpart Patent Cooperation Treaty Application No. PCT/US2015/42827, mailed Oct. 30, 2015, 9 pages.
Validity, OSTP Framework, 24 pages, 2010.
Notification of Transmittal of the International Search Report and the Written Opinion from counterpart Patent Cooperation Treaty Application No. PCT/US15/50348, mailed Dec. 22, 2015, 9 pages.
Office Action from U.S. Appl. No. 14/448,868, mailed Dec. 3, 2015, 15 pages.
Office Action from U.S. Appl. No. 14/487,992, mailed Dec. 31, 2015, 12 pages.
Final Office Action from U.S. Appl. No. 14/268,619, mailed Dec. 14, 2015, 10 pages.
Notification of Transmittal or International Search Report and Written Opinion from PCT/US2015/028927, mailed Jul. 30, 2015, 12 pages.
Notice of Allowance from U.S. Appl. No. 14/448,697, mailed Jan. 14, 2016, 23 pages.
Final Office Action from U.S. Appl. No. 14/268,733, mailed Jan. 15, 2016, 14 pages.
Notice of Allowance from U.S. Appl. No. 14/145,533, mailed Jan. 20, 2016, 12 pages.
Office Action from U.S. Appl. No. 14/218,743, mailed Jan. 21, 2016, 12 pages.
Office Action from U.S. Appl. No. 14/218,551, mailed Jan. 21, 2016, 11 pages.
Notice of Allowance from U.S. Appl. No. 14/066,384, mailed Mar. 17, 2016, 40 pages.
Office Action from U.S. Appl. No. 14/268,619, mailed Mar. 21, 2016, 7 pages.
Notice of Allowance from U.S. Appl. No. 14/268,686, mailed Mar. 30, 2016, 38 pages.
Office Action from U.S. Appl. No. 14/218,551, mailed May 12, 2016, 11 pages.
Notice of Allowance from U.S. Appl. No. 14/448,868, mailed May 12, 2016, 11 pages.

* cited by examiner

US 9,396,320 B2

SYSTEM AND METHOD FOR NON-INTRUSIVE, PRIVACY-PRESERVING AUTHENTICATION

CROSS REFERENCE TO RELATED APPLICATIONS

This application claims the benefit of and priority to U.S. Provisional Patent Application No. 61/804,568, filed, Mar. 22, 2013, entitled, "Advanced Methods of Authentication And Its Applications". This application is related to co-pending U.S. patent application Ser. No. 14/145,466, filed Dec. 30, 2013, entitled, "System And Method For Adaptive User Authentication".

BACKGROUND

1. Field of the Invention

This invention relates generally to the field of data processing systems. More particularly, the invention relates to a system and method for non-intrusive, privacy-preserving authentication.

2. Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

Systems have also been designed for providing secure user authentication over a network using biometric sensors. In such systems, the score 135 generated by the application 105, and/or other authentication data, may be sent over a network to authenticate the user with a remote server. For example, Patent Application No. 2011/0082801 ("801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

Authenticators such as those described above require some form of user interaction such as swiping the finger, or entering a secret code. These "normal" authenticators are intended to authenticate the user at a given point in time. In addition, "silent" authenticators may also be used which are designed to authenticate the user's device at a given point in time (rather than the user). These silent authenticators may rely on information extracted from the user's device without interaction by the user (e.g., sending a Machine-ID).

However, there are certain use cases where requiring explicit user interaction presents too much friction (e.g., near field communication (NFC) payments, frequently used apps requiring authentication without being tied to high value transactions), whereas a "silent" authentication technique such as sending a Machine-ID does not provide enough certainty that the legitimate user is still in possession of the device.

Several "continuous" authentication methods have been proposed by the research community such as Anthony J. Nicholson, "Mobile Device Security Using Transient Authentication," IEEE TRANSACTIONS ON MOBILE COMPUTING VOL. 5, NO. 11, pp. 1489-1502 (November 2006), currently at http://www.di.ubi.pthmario/paginas/g2.pdf; Mohammad O. Derawi, "Unobtrusive User-Authentication on Mobile Phones using Biometric Gait Recognition" (2010) currently at http://www.hig.no/content/download/29796/358676/version/1/file/iih-msp.pdf; and Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf). Some of these methods have even been adopted by the industry such as BehavioSec, "Measuring FAR/FRR/EER in Continuous Authentication," Stockholm, Sweden (2009). These methods generally provide an assurance level that the legitimate user is still in possession a device without adding friction to the authentication process, but they focus on a single modality (i.e. using a wearable token, gait recognition, face and color of clothing recognition and user's keyboard input).

One problem which exists, however, is that directly providing location data or other personal (e.g. face image, color of clothing, gait or typing characteristics, . . . ) or environmental data (e.g. temperature, humidity, WLAN SSIDs, . . . ) to the relying party for supplementing the risk estimation violates the user's privacy in some regions of the world. Consequently, more advanced remote authentication techniques are needed which are both non-intrusive and adequately protect the end user's privacy.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
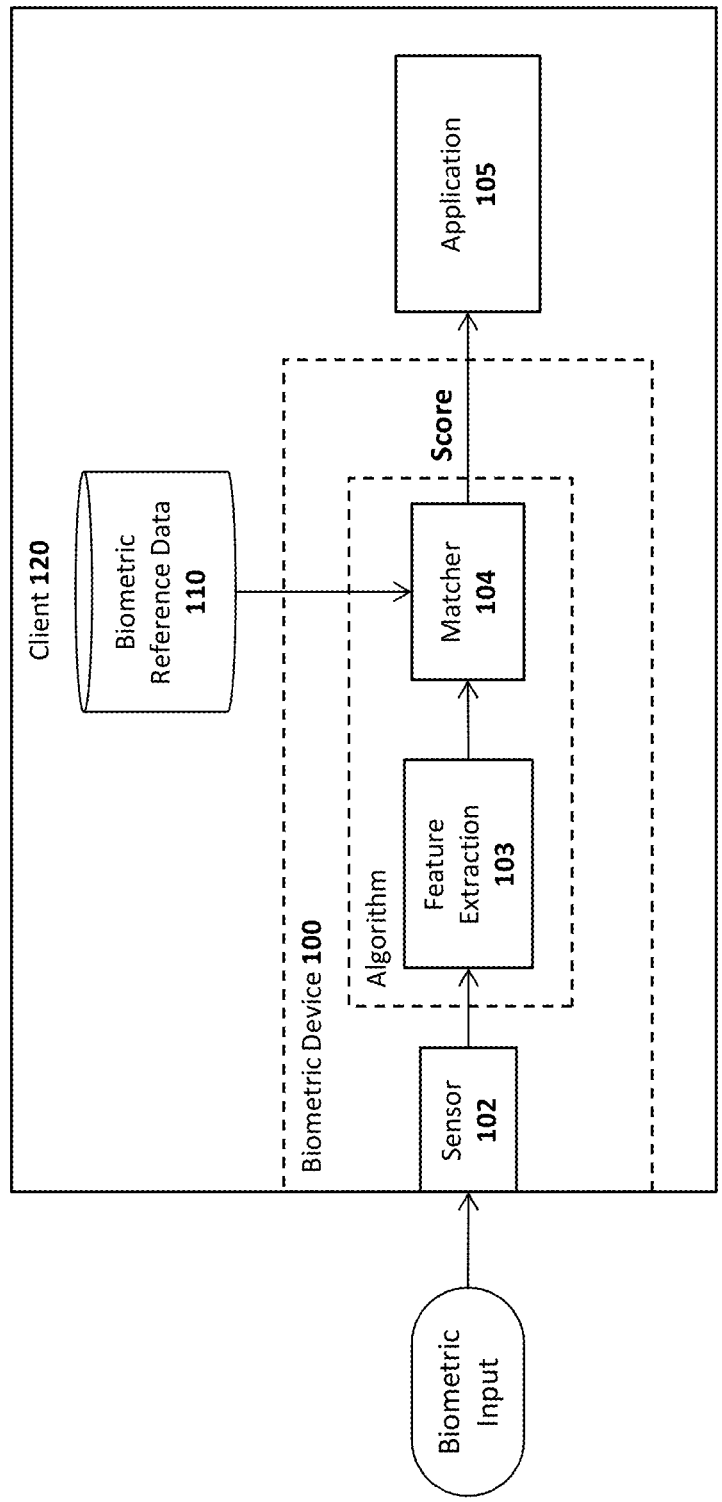
FIG. 1 illustrates an exemplary client equipped with a biometric device.

Described below are embodiments of an apparatus, method, and machine-readable medium for implementing non-intrusive, privacy-preserving authentication using adaptive modalities. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as trusted platform modules (TPMs) and smartcards.

As mentioned above, in a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

One embodiment of the invention uses "normal" authentication techniques (e.g., swiping a finger, entering a code, etc) in order to train the authentication system to recognize non-intrusive authentication situations. In addition, one embodiment returns the authentication state of the device to the relying party rather than sensitive information such as a Machine ID when authentication is required.

Some embodiments of the invention described below may work completely frictionless (i.e. without requiring any explicit user authentication). Behavioral or other techniques may be used to continuously measure an assurance level which indicates the current assurance that an authorized user is in possession of the device. The assurance level may be calculated, for example, based on the time which has passed since the last explicit user authentication (e.g., to SIM card or phone unlock with PIN or finger swipe). Assuming that amount of time which has passed is within a particular threshold (e.g., 5 seconds, 5 minutes, 1 hour, etc), the device may be considered to be in a "legitimate user state" and the assurance level set to a maximum value (e.g., 100 on a normalized scale of −100 to 100).

Following the legitimate user state, the assurance level may be measured based on a combination of the elapsed time since explicit user authentication and other variables which indicate that the authorized user is in possession of the device (e.g., based on non-intrusive input detected from device sensors). For example, the biometric gait of the user may be measured using an accelerometer or other type of sensor in combination with software and/or hardware designed to generate a gait "fingerprint" from the user's normal walking pattern. In addition, the distance to frequently visited destinations of the legitimate user may be tracked, stored and subsequently used to determine the assurance level. For example, if the user is connecting to a relying party from a location known to be the user's home or office, then the assurance level may be set to a relatively high value, whereas if the device is connecting from an unknown or distant location, then the assurance level may be adjusted to a lower level.

Various other types of non-intrusive measurements may be performed to determine whether the authorized user is in possession of the device including, for example, the identity of networks or devices to which the client device is connected such as Bluetooth devices, near field communication (NFC) devices, Wifi devices such as routers or access points, smart watches, other computing devices, Nymi bracelets, to name a few. Wifi devices may include the visibility of Wifi networks in reach such as a personal Wifi router at home and Wifi-enabled computers used by colleagues or family members. In addition, certain specific characteristics of the client device such as acceleration sensor characteristics and digital camera sensor pattern noise, may be used for non-intrusive measurements. Touch screen gestures of normal user interaction may also be analyzed and stored as reference data as well as user typing behavior from normal user interaction. Of course, the foregoing are merely examples; the underlying principles of the invention are not limited to any set of non-intrusive variables.

The end result is that an assurance level that the legitimate user still is in the possession of the device may be sent to the relying party in the authentication response. In one embodiment, the assurance level is "signed" or otherwise authenticated by a key (e.g., a relying-party specific key established and attested in a registration phase as discussed below). In one embodiment, the assurance level is normalized to a value between −100 and 100, where −100 means "almost certain it is not the legitimate user," 0 means "don't know," and 100 means "almost certain that it is the legitimate user."

In one embodiment, the relying party may ask the client device for using an additional "normal" authenticator response if the assurance level is not acceptable for the envisioned transaction. Regardless of what level of authentication is required, one embodiment does not disclose personal data to the relying party. Instead, it uses a cryptographic key dedicated to one specific relying party in order to authenticate the authenticator to the relying party.

Figure 2:
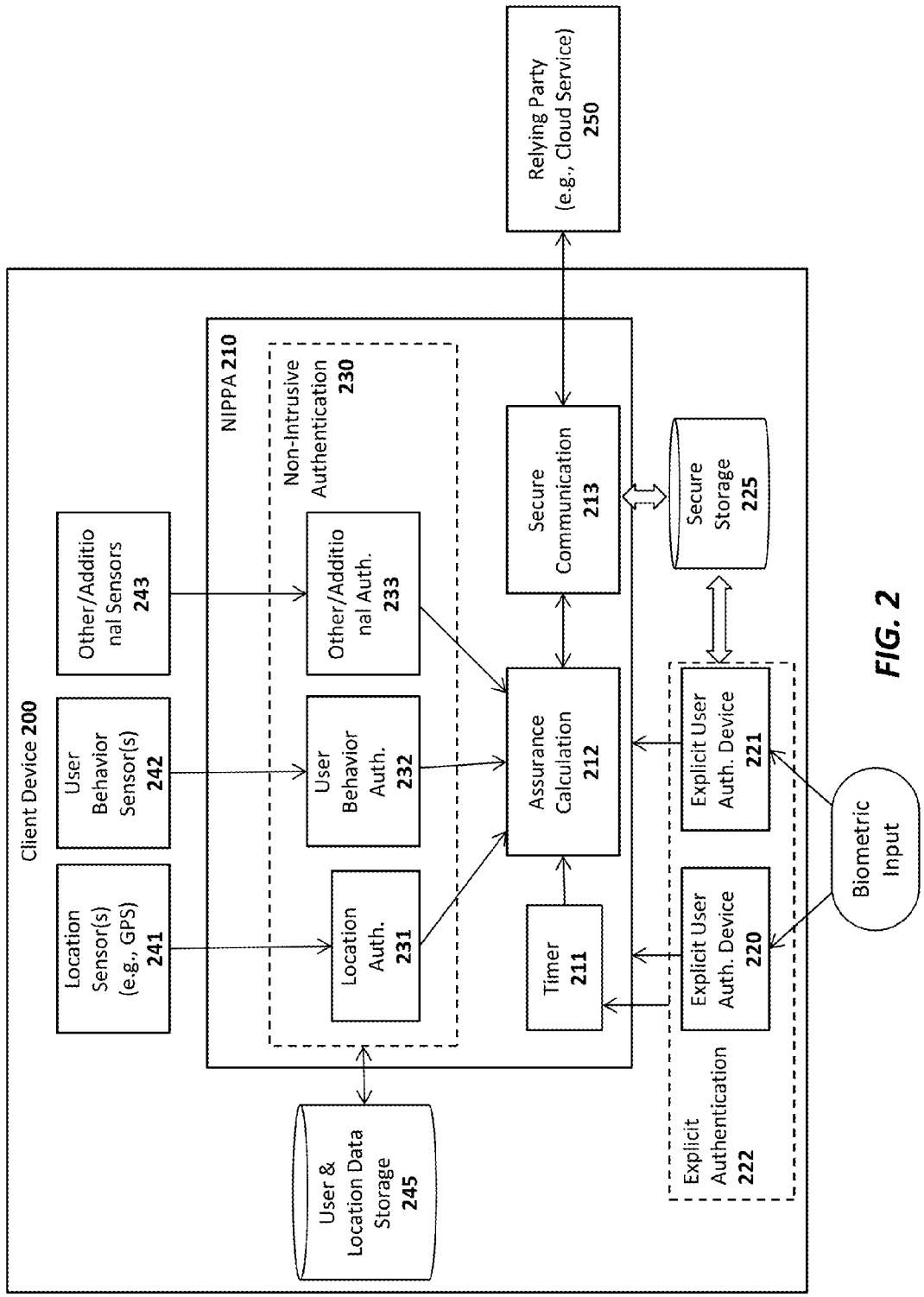
FIG. 2 illustrates one embodiment of a non-intrusive privacy-preserving authenticator (NIPPA)

One embodiment of an architecture for providing non-intrusive privacy-protecting authentication is illustrated in FIG. 2 which includes a non-intrusive privacy-preserving authenticator (NIPPA) 210 including an assurance calculator 212 for determining the current assurance level based on input from non-intrusive authentication mechanisms 230 (e.g., location, gait measurements, etc) and one or more explicit user authentication devices 220-221 (e.g., fingerprint sensors, input devices for entering ID codes, etc). In one embodiment, the explicit user authentication devices 220-221 include the same or similar architecture as shown in FIG. 1.

In the embodiment illustrated in FIG. 2, the non-intrusive authentication 230 includes a location authentication module 231 for performing location-based authentication using a location sensor(s) 241 and historical or user-specified location data stored within a user/location data storage device 245 (e.g., which may be implemented as a file system or database). By way of example and not limitation the location sensor 241 may include a GPS device and/or a module for detecting a current access point or cell tower to which the client 200 is connected (which can be used to estimate the device's current location). Any sensor capable of providing data related to a user's location may be used. The location authentication module 231 determines the effect that the current location of the client device has on the assurance level. For example, if the device is currently at a "home" or "office" location (according to historical or user-specified location data 245) then the assurance level may be adjusted upwards; whereas if device is currently at a distant, unknown location, then the assurance level may be adjusted downwards. In addition to automatically training the system during the "legitimate user state" (as described herein) in one embodiment, the user is provided with the ability to manually specify certain locations as "trusted" and therefore having a high assurance level (e.g. when the user is at home or at the office). The results of the location authentication module 231 are provided to the assurance calculation module 212 to that it may be factored into current assurance level calculations.

The user behavior authentication module 232 relies on one or more user behavior sensors 242 to determine the extent to which the current user behavior is consistent with historical user behavior (stored in user & location data storage 245). For example, the user behavior sensors 242 may provide accelerometer measurements that the user behavior authentication module may use to determine the gait of the user currently in possession of the device 200. It may then compare these measurements with the known gait of the user (collected following prior explicit user authentications and stored in storage device 245) to arrive at a level of confidence that the legitimate user is in possession of the device. The results are provided to the assurance calculation module 212 to that it may be factored into current assurance level calculations.

Various other/additional authentication devices 233 may collect data from other/additional sensors 243 to perform authentication calculations, the results of which are provided to the assurance calculation module 212 to factor into current assurance level calculations.

Although illustrated as separate modules in FIG. 2, the location authentication module 231, the user behavior module 232 and any other authentication modules 233 may form part of the assurance calculation module 212. The underlying principles of the invention may be implemented using various different logical arrangements of modules.

As illustrated, in one embodiment, the assurance calculation module 212 relies on a timer 211 when measuring the amount of time which has passed since the last explicit user authentication. As discussed in detail below, the amount of time which has passed since the last explicit user authentication may be used to determine whether the device is currently in a "legitimate user state" and to adjust the assurance measurement accordingly.

Once the assurance calculation module 212 has arrived at a current assurance measurement, it may communicate the measurement to a relying party (a cloud service in one embodiment) established via a secure communication module 213. For example, each authenticator 220-221, including the non-intrusive authenticator 230 may exchange a relying-party-specific and attested key in a registration operation (preceding authentication). The assurance level returned in the authentication operation may be part of a message signed/encrypted by the relying-party-specific authentication key. In addition, as discussed below, the message may also include nonce (e.g., a random challenge) generated by the relying party.

In one embodiment, secure storage 225 is a secure storage device provided for storing the authentication keys associated with each of the authenticators and used by the secure communication module 213 to establish secure communication with the relying party.

As mentioned, in one embodiment, the NIPPA 210 leverages existing (explicit) user authentication techniques (e.g. password based system login, SIM card unlock, etc) to maintain a "legitimate user" state within a defined time window after each of such successful authentication (up to T1 seconds). The NIPPA 210 may periodically measure user behavior from the various sensors 241-243 and while in the "legitimate user" state, may update its internal reference data vector according to the measurement. While not in the "legitimate user" state, the NIPPA 210 may compute the normalized "distance" to the reference data vector based on the current measurement. This "distance" is considered the certainty that the legitimate user is still in possession of the authenticator.

When asked to authenticate a user, the NIPPA 210 may check to determine whether it is in the "legitimate user" state. If so, authentication is considered successful and the maximum assurance level (e.g., 100) is returned. If not in the "legitimate user" state, the NIPPA 210 may return an assurance level computed by the assurance calculation module 212 based on the latest measurements. The NIPPA 210 may then combine the assurance level with the time difference td of that measurement tm to current time tc (td=tc−tm). In one embodiment, this is done using the following logic:

(1) if (assurance-level>=0) then resulting-assurance-level=assurance-level*(max (T0−td, 0)/T0), where T0 is the maximum acceptable time difference; and (2) if (assurance-level<0) then resulting-assurance-level=assurance-level.

Figure 3:
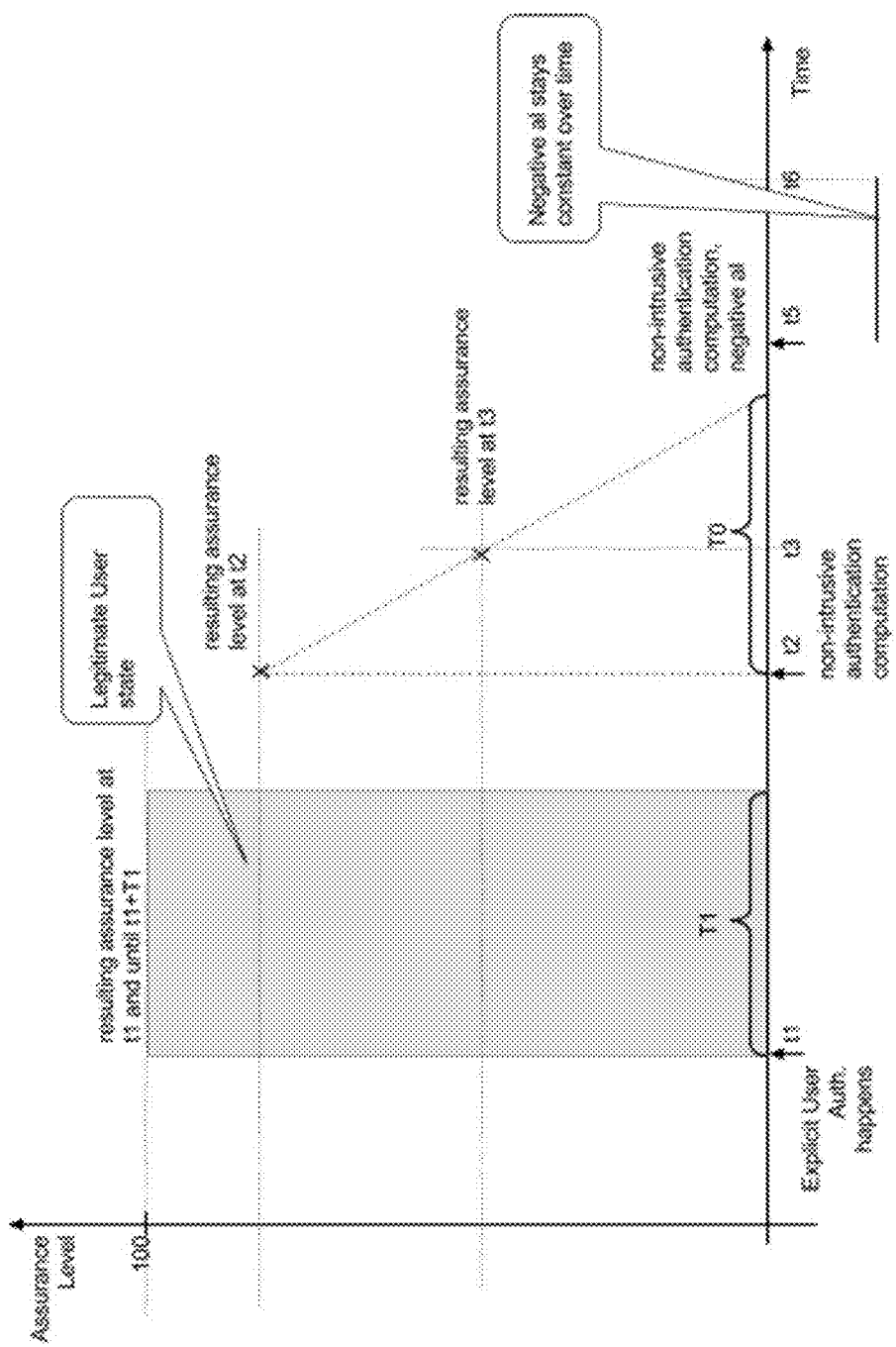
FIG. 3 graphically illustrates the operation of one embodiment of the invention during a "legitimate user state" and following the legitimate user state.

The operation of one embodiment of the invention according to the above equations is illustrated in FIG. 3. At time t1 the user performs an explicit authentication (e.g., swipes a finger, enters a PIN in order to unlock the SIM card, etc). The time window until t1+T1 is considered the "Legitimate User" state. As mentioned, the non-intrusive authenticators may be trained within the legitimate user state. For example, the user's gait may be measured, and/or locations visited by the user may be recorded and subsequently used to perform non-intrusive authentication.

At time t2 (outside of the legitimate user state) the assurance calculation module 212 computes the assurance level based on the non-intrusive authenticator. The result is positive, indicating that it the device is likely in full control of the legitimate user. After this computation, the assurance level decreases over time (e.g., the legitimate user may expose the device to non-legitimate people). For example, at time t3 the assurance level has dropped significantly from time t2. In one embodiment, the non-intrusive assurance level is only computed periodically in order to avoid excessive power and CPU performance consumption.

At t5 another non-intrusive assurance level computation occurs. This time the result is negative, indicating a likelihood that the device is not under full control of the legitimate user. This negative assurance level does not change until another computation is performed based on the non-intrusive authenticator (e.g., at time t6).

Figure 4:
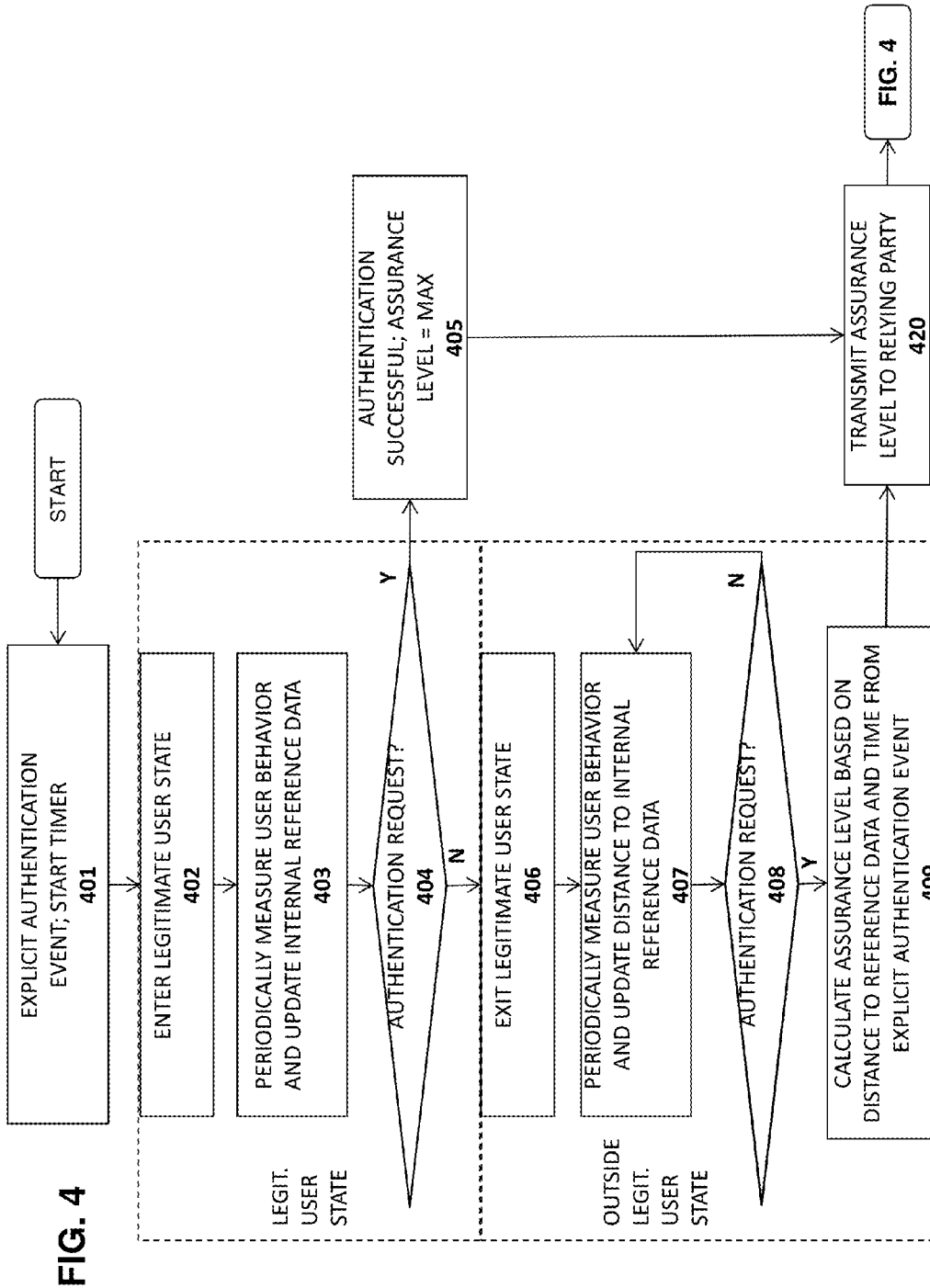
FIGS. 4-5 illustrate one embodiment of a method for non-intrusive privacy-preserving authentication.
Figure 5:
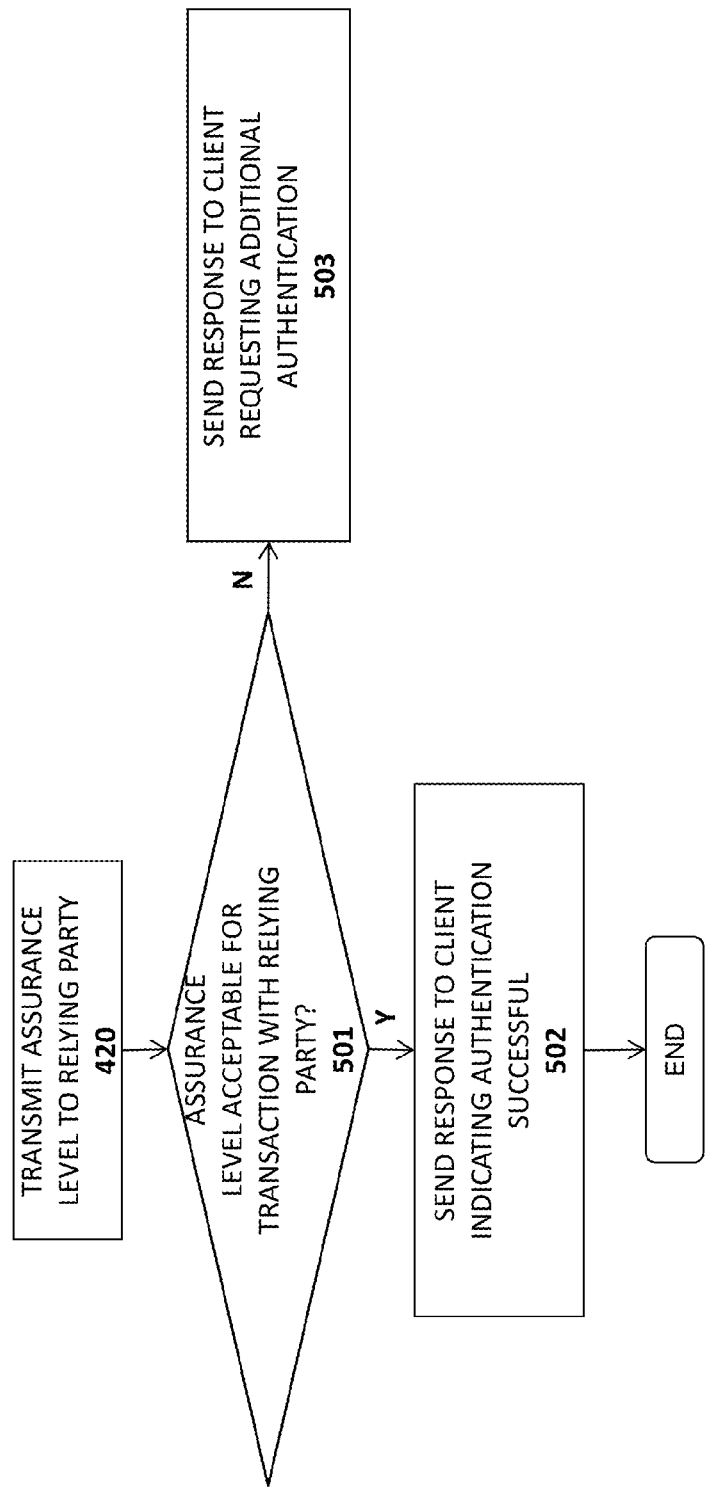

A method in accordance with one embodiment is illustrated in FIGS. 4-5. The method may be implemented within the system architecture such as that shown in FIG. 2, but is not limited to any particular system architecture.

At 401, an explicit authentication event occurs such as a swipe on a fingerprint sensor or the entry of a PIN to unlock the device. A timer may also be started to measure the time which has elapsed from the explicit authentication event. At 402, the legitimate user state is entered and at 403, various aspects of user behavior may be measured and stored for later reference (e.g., locations, user gait, etc). If an authentication request occurs during the legitimate user state, determined at 404 (e.g., resulting from a transaction with a relying party), then at 405 the maximum assurance level is selected and sent to the relying party at 420.

At 406, the system exits the legitimate user state (e.g., because the timer indicates that a specified amount of time has elapsed). At 407, the system periodically measures the user behavior by comparing data from sensors against internal reference data stored in operation 403. By way of example, measurements associated with the gait of the user (collected when in the legitimate user state) may be compared with current gait measurements (collected at 407) and a correlation between the two may be calculated (referred to as the "distance" to the reference data). If an authentication request is received when outside of the legitimate user state, determined at 408, then at 409 the current assurance level is calculated based on the distance to the internal reference data and potentially the time from the explicit authentication event. The assurance level is then transmitted to the relying party at 420.

Turning to FIG. 5, if the assurance level transmitted to the relying party is acceptable for the current transaction with the user, determined at 501, then the relying party may send a response to the client device indicating a successful authentication. If not, then at 503, the relying party may send a response to the client indicating that additional authentication is needed (e.g., potentially explicit user authentication if non-intrusive authentication is insufficient).

In an alternate embodiment, the relying party may initially specify an assurance level required for a particular transaction and the system will ensure that the required assurance level is met, potentially using explicit user authentication if the non-intrusive authentication techniques are insufficient. The system may then send the relying party an indication of successful authentication (rather than an assurance level).

Figure 6:
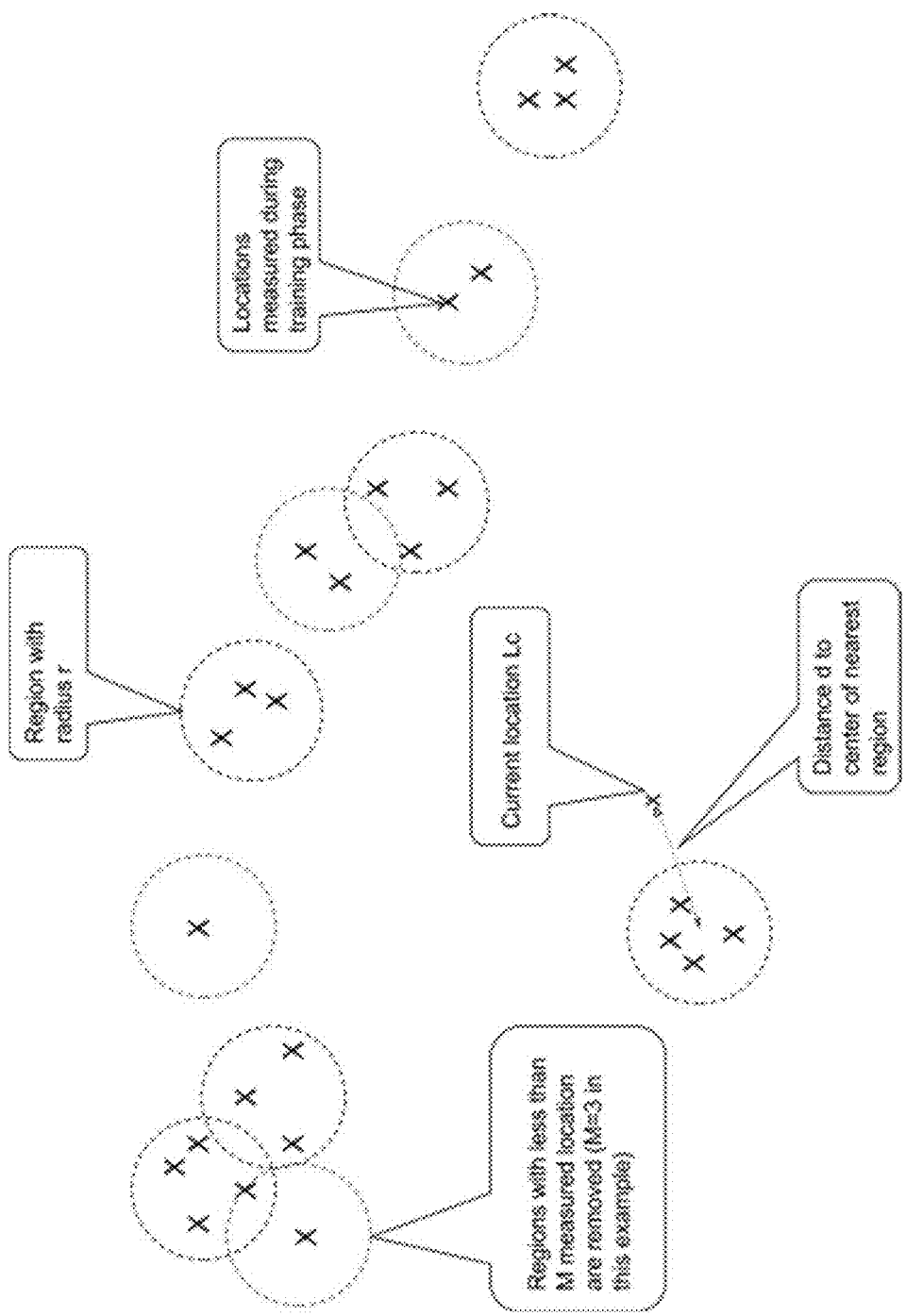
FIG. 6 illustrates a distance function employed for location-based authentication in one embodiment.

As mentioned above, one embodiment of the invention calculates a distance from a set of known user locations to determine the assurance level. Referring to FIG. 6, location-based measurements (e.g., such as GPS) may be used to calculate the "distance" function as follows.

In a preprocessing operation, all measured locations (Ln) are assigned to their nearest "regions." A region is defined as a circle with a radius of r (e.g. 10 meters). The Regions are placed such that a minimal number of Regions covers all Ln. All regions which cover fewer than M locations are removed from the set of Regions (i.e., as they are not considered "frequent" locations of the user).

The "distance" (d) is then determined using distance=(distance of the current location (Lc) to the nearest center of a Region (Rn))/r where r is the radius of a region. This value is smaller or equal to 1 if Lc is inside an existing region and may get very big if Lc is outside. The assurance level is then calculated using: Assurance-Level=Max(100−50*floor(d), −100), which will be in the range of −100 to 100.

In some of the embodiments above, it is assumed that the legitimate user is still in possession of the client device within a specific time window following an explicit authentication or if current behavior is very similar to measured behavior. However, the above embodiments only update the behavioral reference data inside a specific time window after an explicit authentication.

Figure 7:
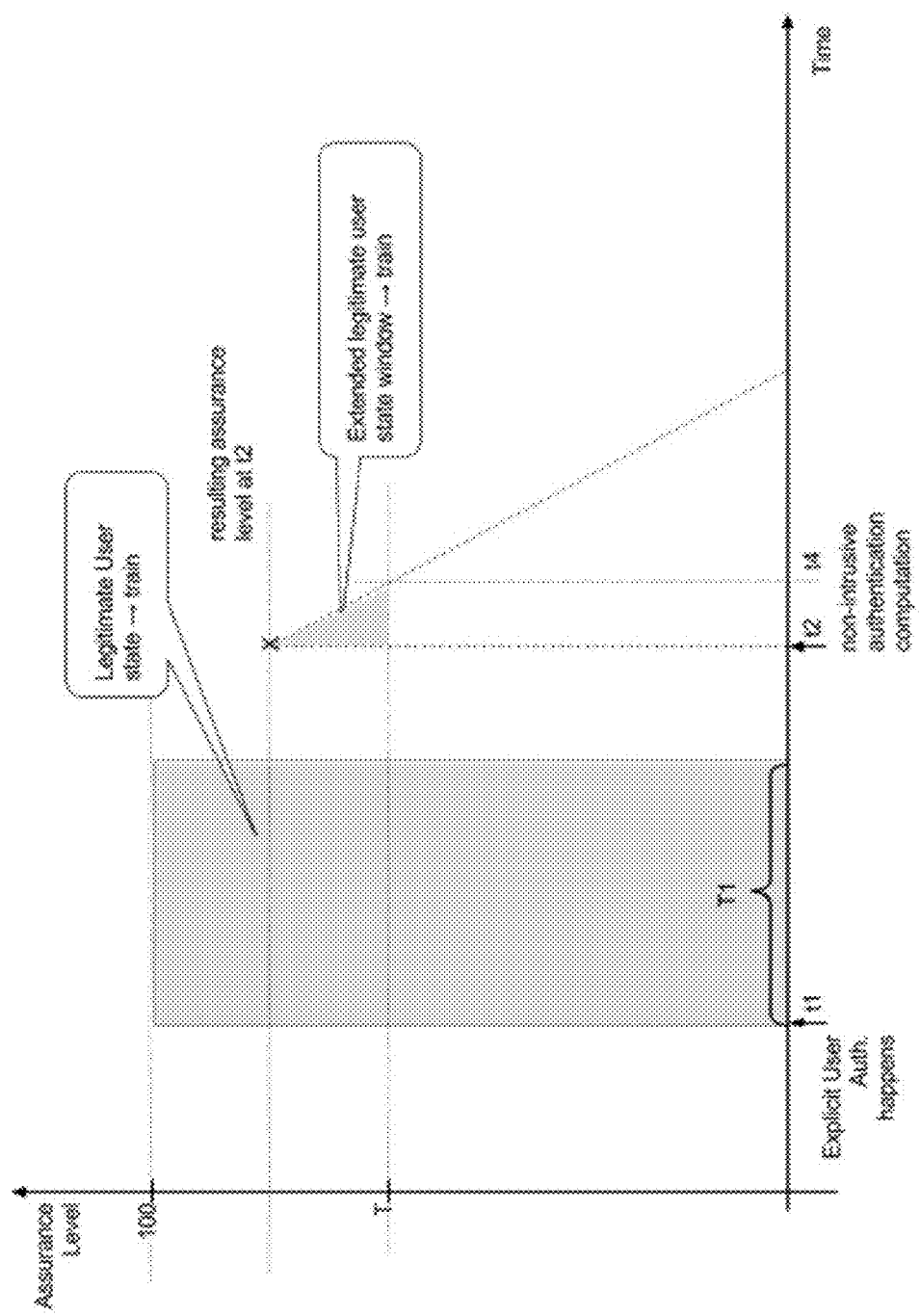
FIG. 7 graphically illustrates the operation of one embodiment of the invention using an extended legitimate user state window.

As illustrated in FIG. 7, one embodiment of the invention uses an extended time window to update behavioral reference data (i.e., train the system) in addition to the standard time window for the legitimate user state. As a result, the complete time window (including the standard time window and extended time window) may be defined as follows: (1) if inside the legitimate user state time window following a successful explicit user authentication (i.e. t1 ... t1+T1), or (2) if the returned assurance level would be above a certain threshold T (e.g., T=90 at, e.g., t2, t4, etc). Setting the threshold to 0 is undesirable because it would make it very easy for an attacker to "shift" the behavioral reference to his favor.

Figure 8:
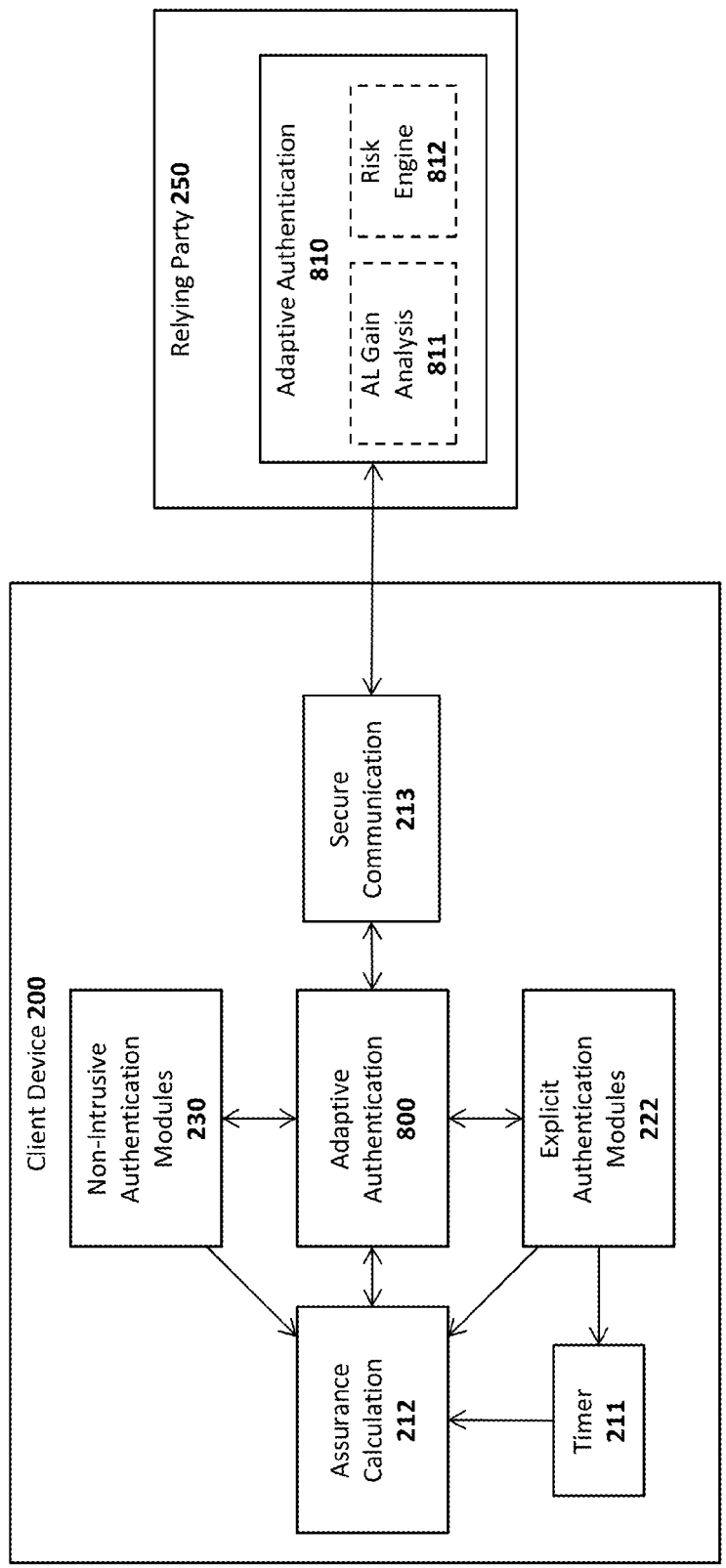
FIG. 8 illustrates an adaptive authentication module in accordance with one embodiment of the invention.

FIG. 8 illustrates one embodiment of the invention for implementing adaptive authentication techniques. As in the embodiments discussed above, this embodiment includes one or more non-intrusive authentication modules 230 for performing non-intrusive authentication (e.g., based on location, sensed user behavior, etc) and one or more explicit authentication modules 222 for performing explicit user authentication (e.g., requiring a PIN, fingerprint scan, etc). In addition, as in prior embodiments, an assurance calculation module 212 performs assurance calculations based on, for example, the time since the last explicit authentication (provided by timer 211) and/or authentication data provided by the various authentication modules 230, 222. The secure communication module 213 establishes secure communication with the relying party 250 (e.g., using a secure encryption key as discussed above).

In one embodiment, an adaptive authentication module 800 dynamically selects among the available non-intrusive authentication techniques and explicit/intrusive authentication techniques to arrive at an assurance level sufficient for a current transaction with the relying party 250. Alternatively, or in addition, an adaptive authentication module 810 on the relying party 250 may perform the authentication selection techniques to arrive at a sufficient assurance level. The underlying principles of the invention remain the same regardless of whether the authentication selection techniques are implemented on the client device 200 (by adaptive authentication module 800) or the relying party 250 (by the adaptive authentication module 810).

Moreover, the "relying party" 250 illustrated in FIG. 8 may represent a trusted third party server which may implement the authentication techniques described herein on behalf of the relying party, and provide the results to the relying party. Thus, while the embodiments of the invention are described in terms of a "relying party," the underlying principles of the invention may be implemented using servers outside of the perimeter of the network operated by the relying party.

As discussed in greater detail below, in one embodiment, the adaptive authentication module 810 includes a risk engine 812 to determine a risk level based on variables associated with the client device (e.g., based on current IP address, IP packet round-trip delay times, etc). In addition, an assurance level gain analysis component 811 may determine the amount by which a current assurance level must be increased to arrive at an acceptable assurance level. While these elements are illustrated in FIG. 8 as components of the adaptive authentication module 810 of the relying party, they may also be implemented within the adaptive authentication module 800 of the client while still complying with the underlying principles of the invention.

In one embodiment, once a client device 200 connects to the relying party 250 (e.g., to initiate a transaction), the risk engine 812 determines the risk (or an assurance level) based on all data currently available. This may include, for example, a geo-location of the client device 200 (e.g., as derived from the IP address, or provided by a mobile network operator), the round-trip delay times of packets transmitted between the client device 200 and relying party 250, the number of hops for network packets sent between the client device 200 and relying party 250, a specific "user agent" string sent by a user agent executed on the client device 200, to name a few. In one embodiment, the risk engine 812 then evaluates this data to arrive at an implicit "risk score" (or a preliminary assurance level inversely related to the risk score), which may be used to determine the amount of additional assurance required to authenticate the user for a given transaction.

In one embodiment, based on the implicit risk score, the adaptive authentication module on the relying party 810 or the client device 800 determines a set of one or more authentication modules 222, 230 with the potential of increasing the overall assurance level to the required level for an intended transaction (i.e., when combined with the preliminary assurance level/implicit risk score). In one embodiment, the assurance level gain analysis module 811 determines the amount of gain required and the adaptive authentication module 800, 810 is provided with an indication of the required assurance level gain as a parameter. The adaptive authentication module 800, 810 then uses this "gain" parameter in order to determine the most convenient set of authentication techniques (non-intrusive 230 and/or explicit 222) in order to achieve (at least) the required gain. The adaptive authentication module 800 may include a formal description of the selected set of authentication techniques in a response to the relying party 250 (e.g. as an authenticated extension). The relying party 250 may then verify whether the resulting overall assurance level meets the required level.

By way of example, and not limitation, the adaptive authentication module 800 may combine authentication modalities such as device fingerprinting (e.g. recognizing sensor flaws, or camera sensor pattern noise); environmental information (e.g. GPS based location; location derived from WIFI networks; existence of wired or wireless connections to other gadgets like Nymi, smart watches (pebble), or peripherals like headsets, . . . etc.); behavioral data (e.g. the way the user takes the device out of a pocket, typing behavior, gait, . . . etc); the time since the device was in a "trusted" state; and potentially the result of a new explicit authentication using one or more authentication modalities (biometric or otherwise) required to achieve the required (remaining) gain in the assurance level.

The result of the above techniques is that users may opt for the most convenient authentication method. In the case of smartphones this may simply be having access to the phone (see above). Instead of asking the user to select an authentication method and subsequently, requiring the user for another explicit authentication, the relying party 250 sends an indication of the required assurance level gain to the adaptive authenticator 800, 810 which identifies the least intrusive set of authentication techniques. The adaptive authentication module 800, 810 does not always require an explicit (intrusive) user authentication (like entering a PIN or swiping a finger), nor is it solely based on non-intrusive modalities. Instead, the authenticator chooses the appropriate combination of all available modalities (on the client side) such that the required assurance level gain is achieved.

As discussed in detail above, the time since the device was in trusted state is important as hacking/spoofing modalities may take time. For example, if a user loses a phone and someone attempts to hack it, it may take a day before the fingerprint can be captured from the display, an appropriate rubber finger created and subsequently used to gain access. Consequently, requiring a PIN entry after 24 hours or less since last trusted state, would be a sufficient protection against this type of attack. The next level of attack is one in which the fingerprint is captured before having access to the device. These attacks are seen less frequently in practice. However, if the relying party 250 needs protection against such attacks, the adaptive authentication module 800, 810 may need to factor in location data or the existence of other gadgets or peripherals in order to accept the biometric modality.

Figure 9:
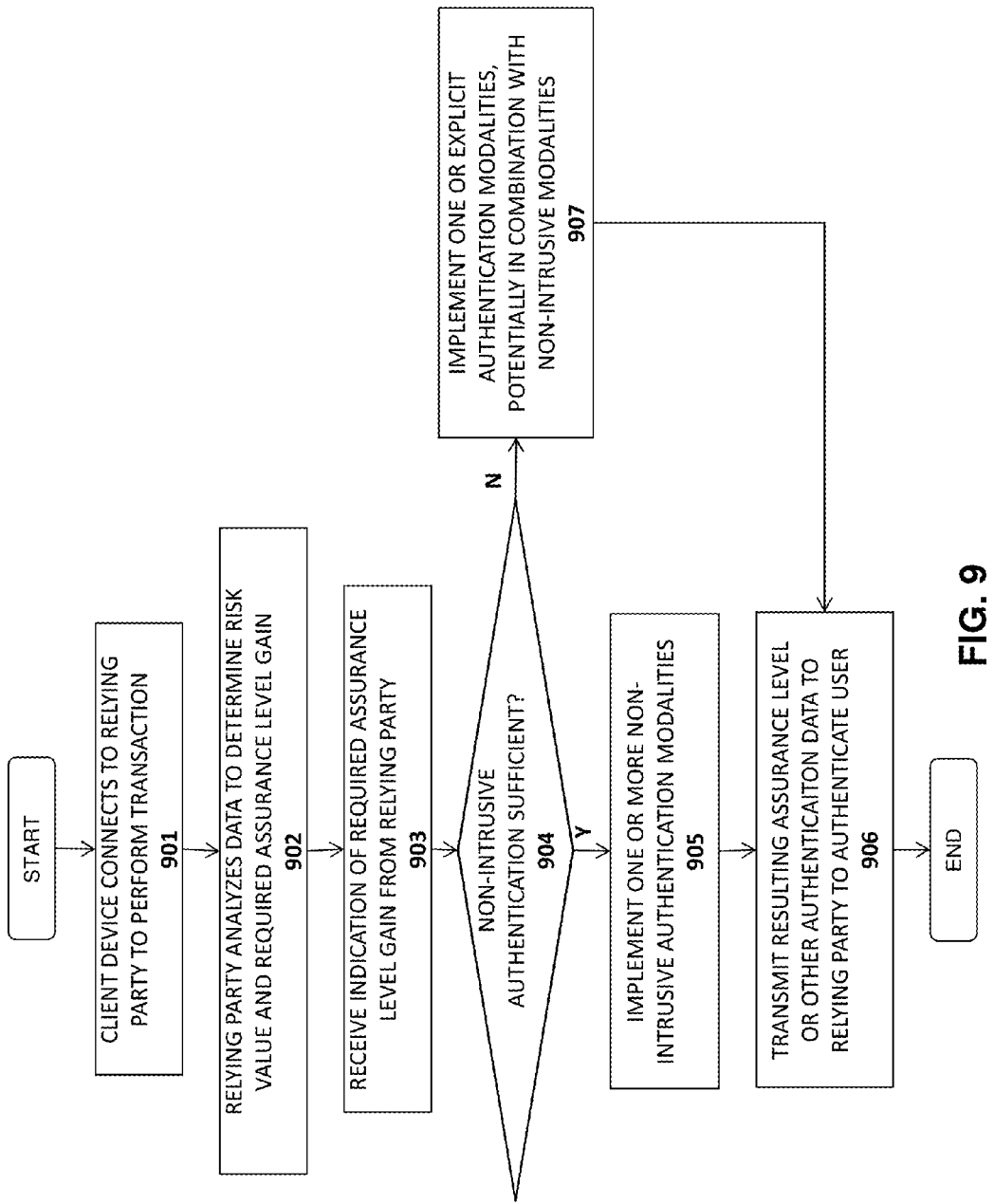
FIG. 9 illustrates one embodiment of an adaptive authentication method.

A method in accordance with one embodiment of the invention is illustrated in FIG. 9. As discussed above, the "relying party" as used herein may be the actual party relying on the accurate authentication of the user or may be a third party service authenticating the user on behalf of the relying party.

At 901, the client device connects to the relying party to perform a transaction (e.g., a transaction to log in to an online account, a monetary transaction, etc). At 902, the relying party analyzes any available data related to the client device to determine a risk value and the required assurance level gain needed to authenticate the user. For example, the data may indicate that the user is connecting to the relying party from an unknown network location (e.g., a foreign country never previously visited by the user) and/or that the number of network routing hops or latency between the client and relying party is above a threshold. In such a case, the risk value may be set to a relatively high value (or, conversely, the implicit assurance level may be low). However, if the user has just recently explicitly authenticated to the device (e.g., entering a PIN), then this would tend to decrease the risk level (or raise the implicit assurance level).

Based on the assurance level required to complete the transaction, the assurance level gain may be determined. This may be accomplished, for example, using an equation such as: Implicit Assurance Level+Assurance Level Gain=Required Assurance Level, or Assurance Level Gain=Required Assurance Level−Implicit Assurance Level. Various other equations may be used to determine the assurance level gain while still complying with the underlying principles of the invention.

At 903, an indication of the needed assurance level gain is received. If non-intrusive authentication techniques are sufficient to meet the assurance level gain, determined at 904, then they are used at 905 to authenticate the user. If not, then at 907, one or more explicit authentication modalities are implemented, potentially in combination with one or more non-intrusive authentication modalities. As mentioned, the modalities may be selected so as to be the least burdensome to the end user (e.g., based on user-specified preferences).

Figure 10:
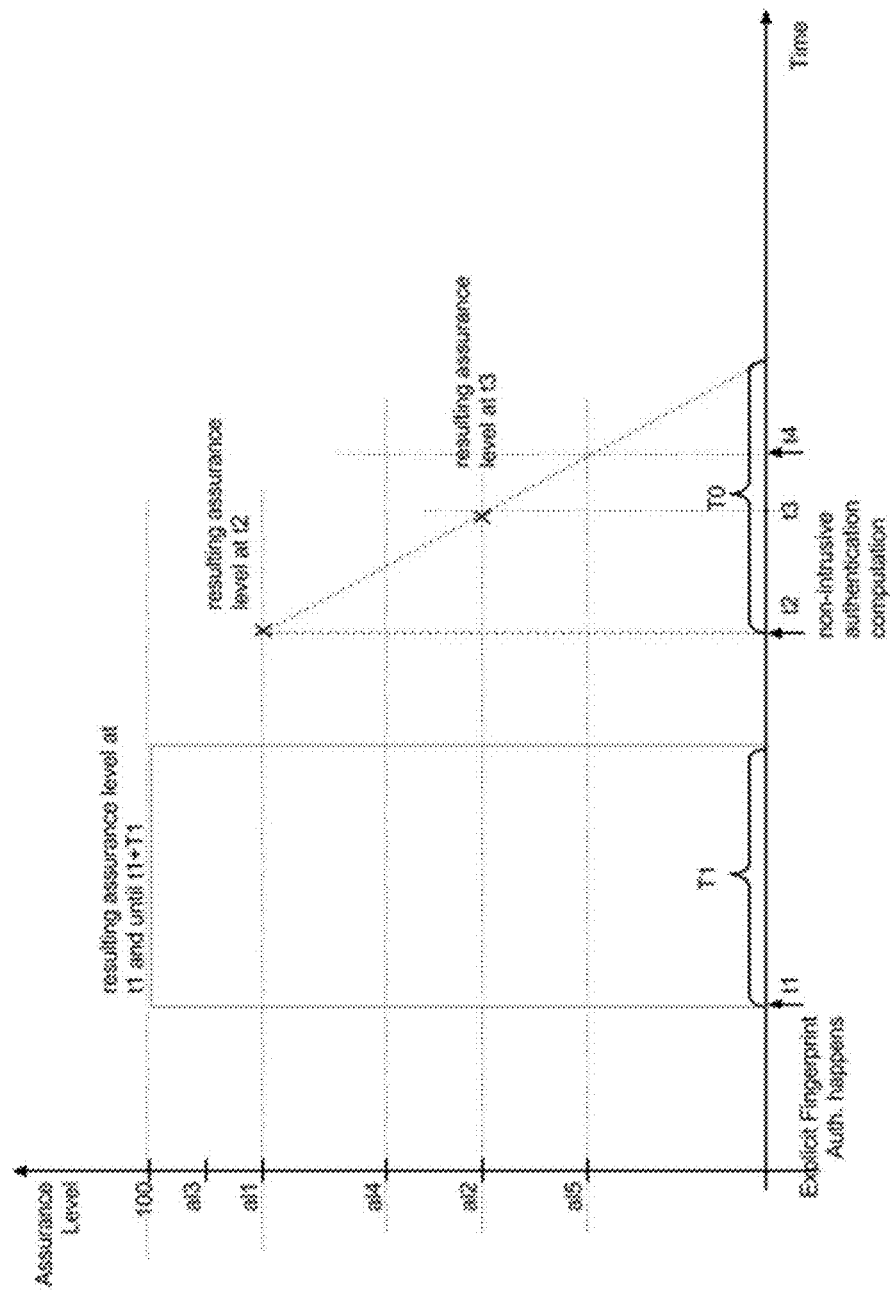
FIG. 10 graphically illustrates adaptive authentication in accordance with one embodiment.

FIG. 10 graphically illustrates how the embodiments of the invention described above may evaluate the assurance level to determine authentication modalities. At time t1, the user performs an explicit authentication (e.g., swiping a finger, entering a PIN, etc). At time t2, the relying party asks for authentication with an assurance level gain of al4. The non-intrusive authentication modality delivers assurance level al1 which is higher than al4, so there is no need to trigger an explicit authentication.

In contrast, at time t4, the relying party asks for authentication with an assurance level gain of al4. The non-intrusive authentication modality would only deliver al5 at that time (as illustrated by the graph). As a consequence, in this case, the adaptive authenticator module will select at least one explicit authentication modality to raise the assurance level from al5 to al4.

Exemplary System Architectures

Figure 11A:
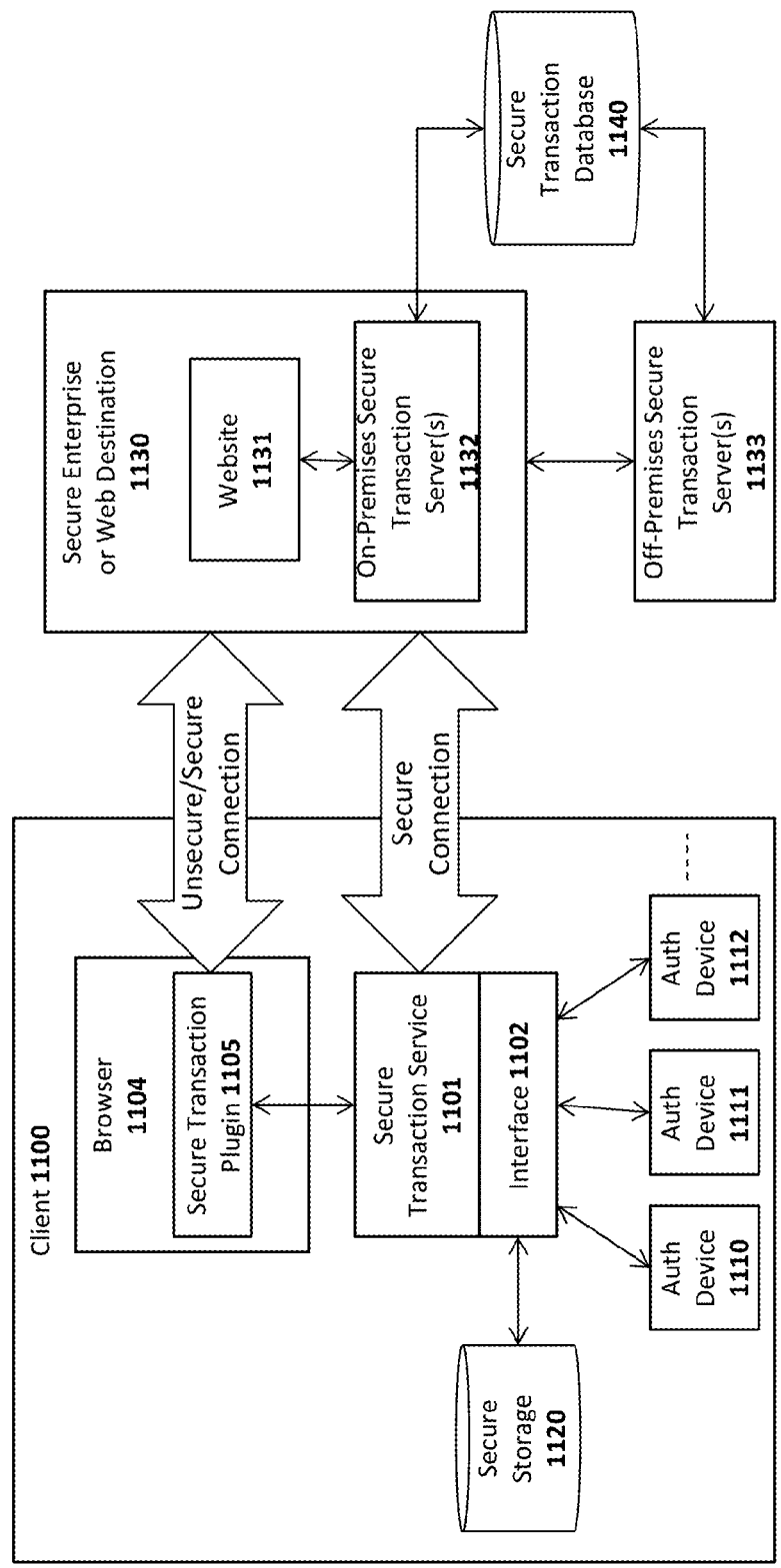
FIGS. 11A-B illustrate different architectural arrangements within which embodiments of the invention may be implemented.
Figure 11B:
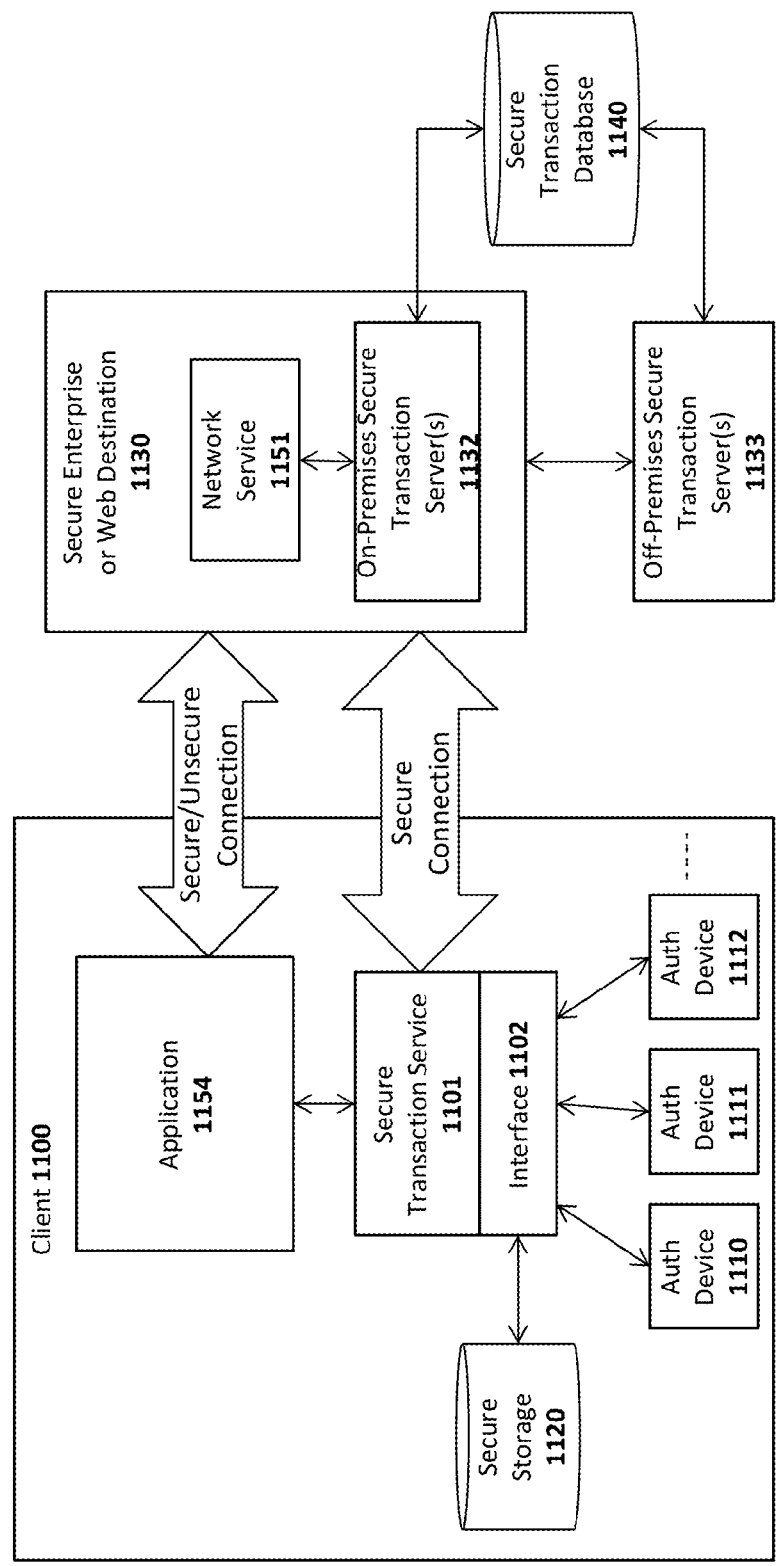

FIGS. 11A-B illustrate two embodiments of a system architecture comprising client-side and server-side components for authenticating a user. The embodiment shown in FIG. 11A uses a browser plugin-based architecture for communicating with a website while the embodiment shown in FIG. 11B does not require a browser. The various techniques described herein for non-intrusive privacy-preserving authentication and adaptive authentication may be implemented on either of these system architectures. For example, the NIPPA 230 shown in FIG. 2 may be implemented as part of the secure transaction service 1101 (including interface 1102) and/or the secure transaction plugin 1105 or application 1152. It should be noted, however, that the embodiment illustrated in FIG. 2 stands on its own and may be implemented using logical arrangements of hardware and software other than those shown in FIGS. 11A-B.

While the secure storage 1120 is illustrated outside of the secure perimeter of the authentication device(s) 1110-1112, in one embodiment, each authentication device 1110-1112 may have its own integrated secure storage. Alternatively, each authentication device 1110-1112 may cryptographically protect the biometric reference data records (e.g., wrapping them using a symmetric key to make the storage 1120 secure).

Turning first to FIG. 11A, the illustrated embodiment includes a client 1100 equipped with one or more authentication devices 1110-1112 for enrolling and authenticating an end user. As mentioned above, the authentication devices 1110-1112 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 1110-1112 are communicatively coupled to the client through an interface 1102 (e.g., an application programming interface or API) exposed by a secure transaction service 1101. The secure transaction service 1101 is a secure application for communicating with one or more secure transaction servers 1132-1133 over a network and for interfacing with a secure transaction plugin 1105 executed within the context of a web browser 1104. As illustrated, the Interface 1102 may also provide secure access to a secure storage device 1120 on the client 1100 which stores information related to each of the authentication devices 1110-1112 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 1130 over a network such as the Internet.

As discussed below, certain types of network transactions are supported by the secure transaction plugin 1105 such as HTTP or HTTPS transactions with websites 1131 or other servers. In one embodiment, the secure transaction plugin is initiated in response to specific HTML tags inserted into the HTML code of a web page by the web server 1131 within the secure enterprise or Web destination 1130 (sometimes simply referred to below as "server 1130"). In response to detecting such a tag, the secure transaction plugin 1105 may forward transactions to the secure transaction service 1101 for processing. In addition, for certain types of transactions (e.g., such as secure key exchange) the secure transaction service 1101 may open a direct communication channel with the on-premises transaction server 1132 (i.e., co-located with the website) or with an off-premises transaction server 1133.

The secure transaction servers 1132-1133 are coupled to a secure transaction database 1140 for storing user data, authentication device data, keys and other secure information needed to support the secure authentication transactions described below. It should be noted, however, that the underlying principles of the invention do not require the separation of logical components within the secure enterprise or web destination 1130 shown in FIG. 11A. For example, the website 1131 and the secure transaction servers 1132-1133 may be implemented within a single physical server or separate physical servers. Moreover, the website 1131 and transaction servers 1132-1133 may be implemented within an integrated software module executed on one or more servers for performing the functions described below.

As mentioned above, the underlying principles of the invention are not limited to a browser-based architecture shown in FIG. 11A. FIG. 11B illustrates an alternate implementation in which a stand-alone application 1154 utilizes the functionality provided by the secure transaction service 1101 to authenticate a user over a network. In one embodiment, the application 1154 is designed to establish communication sessions with one or more network services 1151 which rely on the secure transaction servers 1132-1133 for performing the user/client authentication techniques described in detail below.

In either of the embodiments shown in FIGS. 11A-B, the secure transaction servers 1132-1133 may generate the keys which are then securely transmitted to the secure transaction service 1101 and stored into the authentication devices within the secure storage 1120. Additionally, the secure transaction servers 1132-1133 manage the secure transaction database 1120 on the server side.

One embodiment of the invention employs implicit location-based authentication techniques in a manner which protects the end user's privacy. As mentioned above, sharing a user's current location (e.g., as provided by GPS) with relying parties raises significant privacy concerns. Consequently, users are often reluctant to share such data.

To address these issues, one embodiment of the invention uses geolocation as a factor when performing implicit user authentication but does not disclose the user's location to the relying party. This embodiment may be implemented alone or in combination with other non-intrusive 230 and/or explicit 222 authentication techniques described above (e.g., as part of a larger, comprehensive authentication process). Instead of transmitting the actual location from the client device, only an assurance level may be transmitted which is based (at least in part) on the geolocation data, thereby protecting the user's privacy.

One embodiment employs the following operations for user/device enrollment and registration with a relying party:
1. The user picks and specifies one or more locations where he/she usually performs authentication with websites. This may be a region within a predefined miles or specific locations (like office, home, transportation route, etc). These selected locations may be stored locally on the client device and will not be sent to the relying party. These operations may be performed by the location authentication module 231 described above.
2. In one embodiment, after enrollment is complete, the client device shares a key with the relying party over a secure communication channel (e.g., using secure communication module 213 and other registration techniques described herein).

In one embodiment, the following operations are performed during authentication:

1. The client device determines its current location using one or more geolocation techniques (e.g., retrieving the current location using a location sensor 241 such as an embedded GPS chip).
2. The location authentication module 231 on the client compares the current location with already enrolled locations and produces a score indicating the distance (e.g., from 0-100). The assurance calculation module 212 may then include the score in its assurance calculations (as described above).
3. the client device generates a signature, signs the score/assurance level and sends it to the relying party 250 for final authentication.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. A method comprising:
    entering into a legitimate user state on a client device for a specified time period following a first explicit authentication by an end user;
    recording reference data related to user behavior while in the legitimate user state;
    measuring user behavior when outside of the legitimate user state and arriving at an authentication assurance level based on a distance between the measured user behavior and the recorded reference data;
    entering into a first transaction with a relying party over a network resulting in an authentication request from the relying party;
    in response to receiving the authentication request within the legitimate user state, transmitting an authentication assurance level at or above a defined threshold from the client device to the relying party over the network, the authentication assurance level being sufficient to authenticate the user to the relying party, and the relying party to responsively allow the first transaction; and
    in response to an authentication request while outside of the legitimate user state, transmitting the authentication assurance level based on a distance between the measured user behavior and the recorded reference data from the client device to the relying party over the network;
    wherein in response to receiving the authentication assurance level, determining at the relying party whether the authentication assurance level is acceptable to complete the first transaction, wherein if the assurance level is acceptable, then the relying party to responsively allow the first transaction and wherein if the assurance level is not acceptable, then the relying party to transmit a response requesting additional authentication, the method further comprising:
    performing a second explicit authentication by the end user on the client device to re-enter the legitimate user state; and
    transmitting an authentication assurance level from the client device to the relying party, and the relying party to responsively allow the first transaction.

2. The method as in claim 1 wherein the first and second explicit authentications by the end user comprises the user entering a secret identification code or swiping a finger on a fingerprint authenticator on the client device.

3. The method as in claim 1 wherein recording the reference data based on user behavior comprises using sensors and associated hardware and/or software on the client device to measure gait of the user as the user is walking, the reference data defining a reference gait of the user.

4. The method as in claim 1 wherein recording the reference data based on user behavior comprises using sensors and associated hardware and/or software on the client device to measure locations of the client device while in the legitimate user state, the reference data defining a set of reference locations.

5. The method as in claim 4 wherein in addition to measuring locations of the client device while in the legitimate user state, the client device allows the user to specify certain locations as trusted regions.

6. The method as in claim 1 wherein recording the reference data based on user behavior comprises using sensors and associated hardware and/or software on the client device to measure one or more of the following variables to be used as reference data:
    networks or devices to which the client device is connected;
    smart watches;
    Bluetooth devices;
    near field communication (NFC) devices;
    other computing devices;
    Nymi bracelets;
    Wifi networks in reach;
    Wifi-enabled computers in reach;
    acceleration sensor characteristics;
    digital camera sensor pattern noise;
    touch screen gestures of normal user interaction; and
    user typing behavior from normal user interaction.

7. The method as in claim 1 further comprising:
    continuing to record reference data related to user behavior for an extended window of time outside the legitimate user state.

8. The method as in claim 1 wherein the client device provides for multiple forms of explicit user authentication, wherein at least some forms of explicit user authentication will not result in a maximum assurance level.

9. The method as in claim 1 further comprising:
encrypting the assurance level using a key prior to transmitting the assurance level to the relying party.

10. The method as in claim 1 wherein the explicit authentication by the end user comprises requiring user interaction in order to trigger and/or unlock the explicit authentication.

11. The method as in claim 10 wherein the user interaction comprises selecting a button or tapping on the client device.

12. The method as in claim 1 wherein the relying party initially specifies a required assurance level for a particular transaction and the assurance level gain is selected to ensure that the required assurance level is met.

13. An client device having a memory for storing program code and a processor for processing the program code, the client device comprising:
an explicit user authenticator comprising at least one biometric sensor or keypad to perform a first explicit authentication of an end user, the explicit user authenticator to cause the client device to enter into a legitimate user state for a specified time period following the first explicit authentication; and
one or more additional sensors to collect reference data related to user behavior while in the legitimate user state, the one or more sensors in communication with the processor, the processor to perform the operations of:
recording the reference data related to user behavior while in the legitimate user state;
measuring user behavior using the one or more sensors when outside of the legitimate user state and arriving at an authentication assurance level based on a distance between the measured user behavior and the recorded reference data;
entering into a first transaction with a relying party over a network resulting in an authentication request from the relying party;
in response to receiving the authentication request within the legitimate user state, transmitting an authentication assurance level at or above a defined threshold from the client device to the relying party over the network, the authentication assurance level being sufficient to authenticate the user to the relying party, and the relying party to responsively allow the first transaction; and
in response to an authentication request while outside of the legitimate user state, transmitting the authentication assurance level based on a distance between the measured user behavior and the recorded reference data from the client device to the relying party over the network;
wherein in response to receiving the authentication assurance level, determining at the relying party whether the authentication assurance level is acceptable to complete the first transaction, wherein if the assurance level is acceptable, then the relying party to responsively allow the first transaction and wherein if the assurance level is not acceptable, then the relying party to transmit a response requesting additional authentication, the processor to perform the additional operations of:
performing a second explicit authentication by the end user on the client device to re-enter the legitimate user state; and
transmitting an authentication assurance level from the client device to the relying party, and the relying party to responsively allow the first transaction.

14. The client device as in claim 13 wherein the first and second explicit authentications by the end user comprises the user entering a secret identification code or swiping a finger on a fingerprint authenticator on the client device.

15. The client device as in claim 13 wherein recording the reference data based on user behavior comprises using sensors and associated hardware and/or software on the client device to measure gait of the user as the user is walking, the reference data defining a reference gait of the user.

16. The client device as in claim 13 wherein recording the reference data based on user behavior comprises using sensors and associated hardware and/or software on the client device to measure locations of the client device while in the legitimate user state, the reference data defining a set of reference locations.

17. The client device as in claim 16 wherein in addition to measuring locations of the client device while in the legitimate user state, the non-intrusive privacy-preserving authenticator allows the user to specify certain locations as trusted regions.

18. The client device as in claim 13 wherein recording the reference data based on user behavior comprises using sensors and associated hardware and/or software on the client device to measure one or more of the following variables to be used as reference data:
networks or devices to which the client device is connected;
smart watches;
Bluetooth devices;
near field communication (NFC) devices;
other computing devices;
Nymi bracelets;
Wifi networks in reach;
Wifi-enabled computers in reach;
acceleration sensor characteristics;
digital camera sensor pattern noise;
touch screen gestures of normal user interaction; and
user typing behavior from normal user interaction.

19. The client device as in claim 13 wherein the non-intrusive privacy-preserving authenticator continues to record reference data related to user behavior for an extended window of time outside the legitimate user state.

20. The client device as in claim 13 wherein the client device provides for multiple forms of explicit user authentication, wherein at least some forms of explicit user authentication will not result in a maximum assurance level.

21. The client device as in claim 13 further comprising:
a secure communication module to encrypt the assurance level using a key prior to transmitting the assurance level to the relying party.

22. The client device as in claim 13 wherein the explicit authentication by the end user comprises requiring user interaction in order to trigger and/or unlock the explicit authentication.

23. The client device as in claim 22 wherein the user interaction comprises selecting a button or tapping on the client device.

24. The client device as in claim 13 wherein the relying party initially specifies a required assurance level for a particular transaction and the assurance level gain is selected to ensure that the required assurance level is met.

25. The client device as in claim 24 wherein explicit user authentication is required if the calculated assurance level does not reach the required assurance level.

* * * * *